(12) United States Patent
Drew et al.

(10) Patent No.: US 10,579,661 B2
(45) Date of Patent: Mar. 3, 2020

(54) SYSTEM AND METHOD FOR MACHINE LEARNING AND CLASSIFYING DATA

(71) Applicants: Jake Drew, Canton, TX (US); Michael Hahsler, Dallas, TX (US); Tyler Moore, Dallas, TX (US)

(72) Inventors: Jake Drew, Canton, TX (US); Michael Hahsler, Dallas, TX (US); Tyler Moore, Dallas, TX (US)

(73) Assignee: Southern Methodist University, Dallas, TX (US)

( * ) Notice: Subject to any disclaimer, the term of this patent is extended or adjusted under 35 U.S.C. 154(b) by 526 days.

(21) Appl. No.: 14/283,031

(22) Filed: May 20, 2014

(65) Prior Publication Data

US 2014/0344195 A1 Nov. 20, 2014

Related U.S. Application Data

(60) Provisional application No. 61/825,486, filed on May 20, 2013.

(51) Int. Cl.
*G06N 5/04* (2006.01)
*G06F 16/35* (2019.01)

(52) U.S. Cl.
CPC .............. *G06F 16/35* (2019.01); *G06N 5/04* (2013.01)

(58) Field of Classification Search
CPC ....................................................... G06N 5/04
USPC ......................................................... 706/45
See application file for complete search history.

(56) References Cited

PUBLICATIONS

Michael C. Schatz, "CloudBurst: Hightly Sensitive Read Mapping with MapReduce", Bioinformatics, vol. 25, No. 11, Apr. 8, 2009, pp. 1363-1369.*
Cheng-Tao Chu, Sang Kyun Kim, Yi-An Lin, YuanYuan Yu, Gary Bradski, Andrew Y. Ng, Kunle Olukotun, "Map-Reduce for Machine Learning on Multicore", Neural Information Processing Systems (NIPS) 2006, Vancouver, BC, CA, 2006, pp. 281-288.*
Scott McGinnis and Thomas L. Madden, "BLAST: at the core of a powerful and diverse set of sequence analysis tools", Nucleic Acids Research, vol. 32, 2004, pp. W20-W25.*
Rares Vernica, Michael J. Carey , Chen Li, "Efficient Parallel Set-Similarity Joins Using MapReduce", SIGMOD '10, Proceedings of the 2010 ACM SIGMOD International Conference on Management of data, 2010, pp. 495-506.*
Tagawa et al ("Concurrent Differential Evolution Based on MapReduce" 2010).*
Bose et al ("Beyond Online Aggregation: Parallel and Incremental Data mining with Online Map-Reduce" 2010).*
Polo et al ("Performance-Driven Task Co-Scheduling for MapReduce Environments" 2010).*
Buhler, J., "Efficient large-scale sequence comparison by locality-sensitive hashing," Bioinformatics, 17(5), 2001, pp. 419-428.

(Continued)

*Primary Examiner* — Lut Wong
(74) *Attorney, Agent, or Firm* — Daniel J. Chalker; Chalker Flores, LLP

(57) ABSTRACT

The present invention relates in general to the field of parallel data processing, and more particularly to machine learning and classification of extremely large volumes of unstructured gene sequence data using Collaborative Analytics Gene Sequence Classification Learning Systems and Methods.

43 Claims, 9 Drawing Sheets

(56) References Cited

PUBLICATIONS

Chiu, C.-Y., et al., "Fast min-hashing indexing and robust spatio-temporal matching for detecting video copies," ACM Transactions on Multimedia Computing, Communications, and Applications, 6(2):10, 2010.

Chu, C., et al., "Map-Reduce for machine learning on multicore," Advances in neural information processing systems, 19:281, 2007.

Dean, J., et al., "Mapreduce: A flexible data processing tool," Communications of the ACM, 53(1):72-77, Jan. 2010.

Drew, J., "Mapreduce, map reduction strategies using c#" Jake Drew, My Latest Work:) Wordpress Blog, Jan. 8, 2013, url:http://jakemdrew.wordpress.com/2013/01/08/mapreduce-map-reduction-strategies-using-c/.

Edgar, R. C., "Search and clustering orders of magnitude faster than BLAST," Bioinformatics (Oxford, England), 26(19)(1):2460-1, Aug. 12, 2010.

Keco, D., et al., "Parallelization of genetic algorithms using Hadoop Map/Reduce," SouthEast Europe Journal of Soft Computing, 1(2), 2012.

Li, L., et al., "Scene: A scalable two-stage personalized news recommendation system," ACM Conference on Information Retrieval (SIGIR), Jul. 24-28, 2011, pp. 125-134.

Marçais, G., et al., A fast, lock-free approach for efficient parallel counting of occurrences of k-mers. Bioinformatics, 27(6):764-770, Jan. 7, 2011.

McKenna, A., et al, "The genome analysis toolkit: A MapReduce framework for analyzing next-generation DNA sequencing data," Genome Research, 20(9):1297-1303, 2010.

Rajamaran, A., et al., "Mining of Massive Datasets," Cambridge University Press, 2010-2014.

Vinga, S., et al., "Alignment-free sequence comparison—a review," Bioinformatics, 19(4):513-523, 2003.

Wang, Q., et al. "Naive Bayesian classifier for rapid assignment of RNA sequences into the new bacterial taxonomy,"Applied and Environmental Microbiology, 73(16):5261-5267, Jun. 22, 2007.

Chum, O., et al., "Geometric min-Hashing: Finding a (Thick) Needle in a Haystack," Computer Vision and Pattern Recognition, 2009, IEEE, pp. 17-24.

* cited by examiner

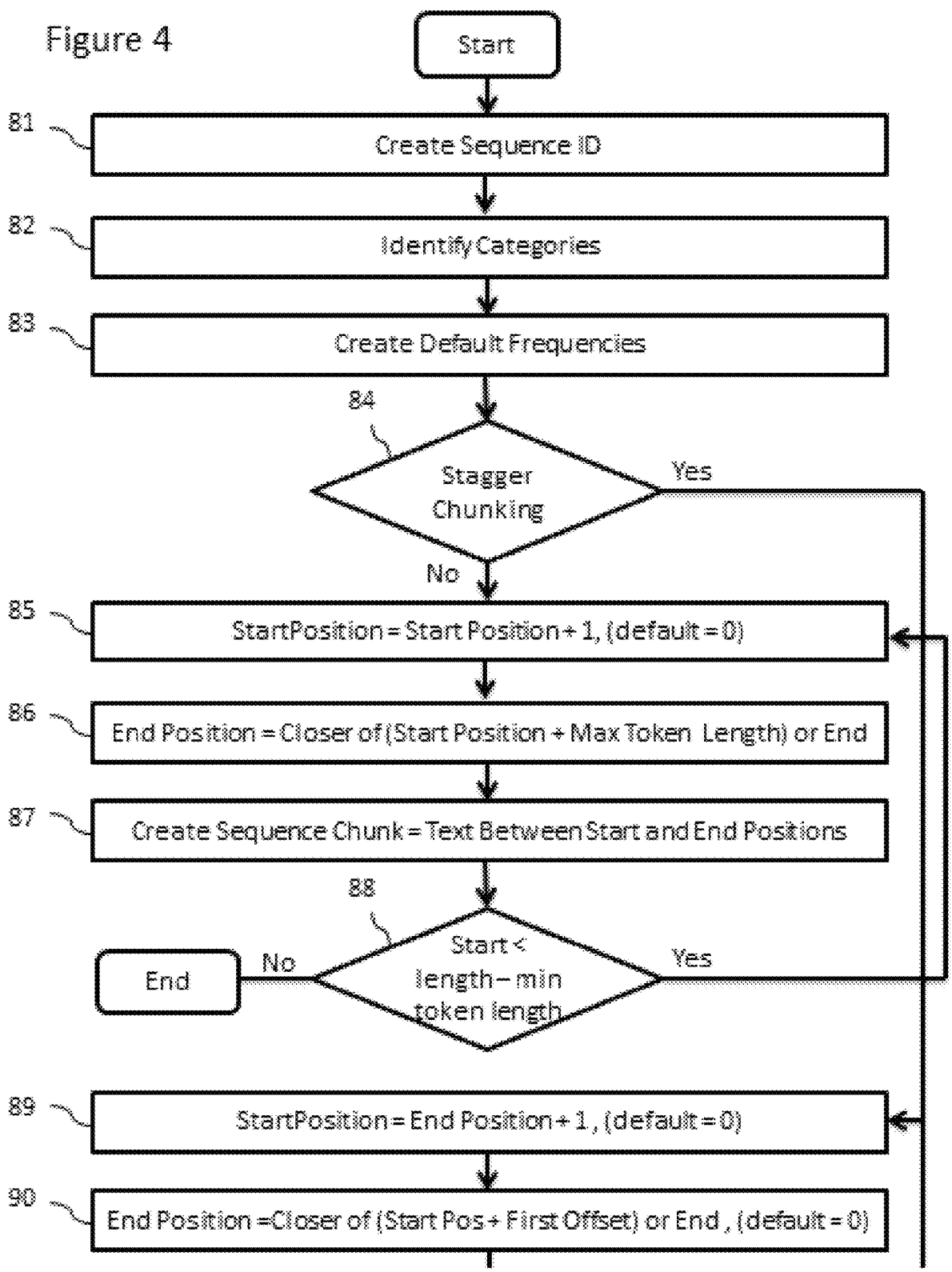

SYSTEM AND METHOD FOR MACHINE LEARNING AND CLASSIFYING DATA

CROSS-REFERENCE TO RELATED APPLICATIONS

This application claims priority to U.S. Provisional Patent Application No. 61/825,486, filed on May 20, 2013, which is hereby incorporated by reference in its entirety.

STATEMENT OF FEDERALLY FUNDED RESEARCH

Not Applicable.

REFERENCE TO A SEQUENCE LISTING

Not Applicable.

TECHNICAL FIELD OF THE INVENTION

The present invention relates in general to the field of data processing, and more particularly to machine learning and classifying large volumes of data.

BACKGROUND OF THE INVENTION

Without limiting the scope of the invention, its background is described in connection with gene sequence data. Several systems such as the BLAST system include features for the learning and classification of gene sequence data. However, current solutions do not provide the functionality to automatically distribute learning and classification processes across multiple processors and disks in a distributed parallel computing environment using a map reduction aggregation method. Furthermore, current learning and classification systems implement a rigid framework which requires the use of a single predefined aggregation method and classification metric function. In addition, the current storage requirements of learned gene sequence data in existing systems makes it infeasible to store a very large amount learned gene sequence data on devices with limited hard disk storage space such as a lap top computer.

The limitations previously described often result in extensive and sometimes very overhead intensive input data pre-processing in order to transform the targeted gene sequence data for use within a rigid framework. Furthermore, the rigid framework does not easily support multiple application specific map reduction aggregation methods and classification metric functions created by the application programmer. As the volume of learned gene sequence data increases in these current systems, highly accurate classification of unknown gene sequences requires a very large amount of storage capacity and processing power. In addition, the processing time required for both the learning and classification of gene sequences within current systems is less than desirable.

Accordingly, there is a need for a system and method for machine learning and classifying data.

SUMMARY OF THE INVENTION

The present invention provides a system and method for machine learning and classifying data. When the data is genetic sequence data, the present invention substantially eliminates or reduces disadvantages associated with previous sequence machine learning and classification systems. More specifically, unstructured targeted raw gene sequence data is extracted from various data sources and transformed into a format suitable for performing subsequent learning and/or classification processing thereon. During machine learning, descriptive patterns within the target data are collected and documented using a consistently applied aggregation method which typically collects descriptive statistical facts about gene sequence data of known categories or classification origins. When gene sequence data of unknown categories or classification origins are used as data input, the consistently applied aggregation method can be used to identify descriptive patterns within the unknown data for comparison and classification against all gene sequence data of known classification types and origins within the current system.

A parallel data processing implementation for the purposes of gene sequence machine learning and classification typically comprises the distribution of targeted raw gene sequence data and a consistently applied aggregation method across multiple processors and disks to perform simultaneous computations while taking advantage of increased memory, reduced disk I/O, and the combined processing power of all participating computing devices.

According to one embodiment a Collaborative Analytics Gene Sequence Classification Learning System and Method are provided for the rapid parallel processing, learning, and classification of extremely large volumes of unstructured gene sequence data which allows programmers to create and deploy application specific map reduction aggregation methods and classification metric functions. Map reduction aggregation operations typically comprise at least one or more chunking operations, mapping operations, locality sensitive hashing operations, and possibly reduction operations. Transitional outputs produced by these operations include sequence chunks produced by chunking operations and consumed by mapping operations, sequence tokens produced by mapping operations and consumed by locality sensitive hashing operations, and MinHash set items produced by locality sensitive hashing operations and finally consumed by reduction operations or classification metric function operations.

In one embodiment, the present invention provides a computerized method for classifying data by (a) receiving the data, (b) dividing the received data into two or more chunks, (c) mapping each chunk into a token and storing the token in a token collection, (d) hashing each token using two or more local sensitivity hashing functions, wherein each local sensitivity hashing function contains two or more random hashing seed numbers, determining a minimum hash value for each local sensitivity hashing function, and storing the minimum hash value for each local sensitivity hashing function in a minimum hash set collection, and (e) classifying the data using the minimum hash values for the tokens. The foregoing steps are performed by one or more processors. Note that the method can be implemented as a computer program embodied on a non-transitory computer readable storage medium that is executed using one or more processors for classifying data wherein each step is made up of one or more code segments.

In another embodiment of the present invention, a system for classifying data includes at least one input/output interface, a data storage, and one or more processors communicably coupled to the at least on input/output interface and the data storage. The one or more processors perform the steps of (a) receiving the data from the at least one input/output interface, (b) dividing the received data into two or more chunks, (c) mapping each chunk into a token and storing the token in a token collection within the data storage, (d) hashing each token using two or more local sensitivity hashing functions, wherein each local sensitivity hashing function contains two or more random hashing seed numbers, determining a minimum hash value for each local sensitivity hashing function, and storing the minimum hash value for each local sensitivity hashing function in a minimum hash set collection within the data storage, and (e) classifying the data using the minimum hash values for the tokens.

In yet another embodiment, the present invention provides a system for large-scale and rapid parallel processing, learning, and classification of extremely large volumes of gene sequence data. The system includes a plurality of processes operational on a plurality of interconnected processors. The plurality of processes including a master process for coordinating the processing of a set of at least one gene sequence input data, a set of at least one application-independent Map Reduction Aggregation Methods, a set of at least one application-independent Classification Metric Functions, a set of at least one application-independent category managers, a set of at least one application-independent nested categorical key value pair collections, a set of at least one application-independent reduction operations, a set of at least one application-independent Blocking Mechanisms, a set of at least one transitional outputs collection and worker processes. The master process performing the learning and/or classification processing coordination in response to a request to perform the learning and/or classification processing job, allocating portions of the gene sequences input data containing gene sequence text to at least one of the Map Reduction Aggregation Methods and allocating portions of the gene sequence input data containing gene sequence text and category associations to at least one of the category managers. Each of the Map Reduction Aggregation Methods including at least one Chunking Operations module comprising a first plurality of worker processes for receiving and mapping portions of the gene sequences input data into individual, independent units of transitional Sequence Chunk work comprising a consistently mapped data key and optional values that are conducive to simultaneous parallel Mapping Operations processing, wherein at least two of the first plurality of the worker processes perform Chunking Operations simultaneously in parallel. Each of the Map Reduction Aggregation Methods including at least one Mapping Operations modules comprising a second plurality of worker processes for receiving and mapping transitional Sequence Chunk outputs into individual, independent units of transitional Sequence Token work comprising a consistently mapped data key and optional values that are conducive to simultaneous parallel Locality Sensitive Hashing Operations processing, wherein at least two of the second plurality of the worker processes perform Mapping Operations simultaneously in parallel. Each of the Map Reduction Aggregation Methods including at least one Locality Sensitive Hashing modules comprising a third plurality of worker processes for receiving and performing Locality Sensitive Hashing operations on transitional Sequence Token outputs producing individual, independent units of transitional MinHash Set Items work comprising a collection of minimum hash value keys produced from a plurality of unique hashing functions and optional values that are conducive to simultaneous Reduction Operations processing and/or Classification Metric Functions, wherein at least two of the third plurality of the worker processes perform Locality Sensitive Hashing Operations simultaneously in parallel. Each of the Map Reduction Aggregation Methods including at least one transitional outputs collection allowing for shared thread-safe accesses by at least one worker process acting as a transitional outputs producer and at least one worker process acting as a transitional outputs consumer, wherein a Blocking Mechanism is utilized for managing accesses to the transitional outputs collection, wherein at least two of the worker processes perform production and consumption operations simultaneously in parallel. Each of the Map Reduction Aggregation Methods including at least one Blocking Mechanism that in response to notification when transitional outputs production has started manages the potential differences in the production and consumption speeds between at least one worker process acting as a transitional outputs producer and at least one worker process acting as a transitional outputs consumer, wherein each Blocking Mechanism in response to a complete depletion of transitional outputs by consumption worker processes before the production worker processes have completed production allows consumption worker processes to "block" or wait until additional transitional outputs are produced, wherein each Blocking Mechanism in response to an over-production of transitional outputs by the production worker processes exceeding a pre-defined transitional outputs capacity threshold allows consumption worker processes to "block" or wait until additional transitional outputs are consumed and the transitional outputs capacity threshold is no longer exceeded, wherein at least two of the worker processes perform Blocking Mechanism production and consumption operations simultaneously in parallel. Each reduction operations including at least one application specific Reduction Operations modules comprising a fourth plurality of worker processes for receiving and aggregating transitional MinHash Set Items output by reducing the minimum hash value keys and optional values eliminating the matching keys and aggregating the optional values into at least one nested categorical key value pair collection, wherein at least two of the fourth plurality of the worker processes perform Reduction Operations simultaneously in parallel. Each Classification Metric Function including one or more Classification Metric Function Operations modules comprising a fifth plurality of worker processes for performing frequency, similarity, or distance calculations, wherein each calculation is performed using the items within at least one Map Reduction Aggregation transitional output collection and/or using Map Reduction Aggregation outputs and associated categories consolidated into the Nested Categorical Key Value Pair Collection, wherein at least two of the fifth plurality of worker processes simultaneously perform the Classification Metric Functions Operations in parallel. Each Category Manager including one or more category and gene sequence management functions comprising at least one set of unique categories and Category IDs, gene sequences and Sequence IDs, default frequencies including all Sequence ID and Category ID associations, and category totals including relevant totals for all categories. The Map Reduction Aggregation Methods applying Chunking Operations, Mapping Operations, and Locality Sensitive Hashing Operations to the retrieved input data to produce transitional MinHash Set Item outputs corresponding to a reduced set of minimum hash values representing the unique characteristics of each individual gene sequence text provided within the gene sequence input data. The Classification Metric Functions applying Classification Metric Functions Operations to the transitional MinHash Set Item outputs to produce Classification Totals and/or Penetration Totals corresponding to the similarity, distance, or classification between each individual gene sequence text provided within the gene sequence input data for classification and at least one other MinHash Set Item output and/or using Map Reduction Aggregation outputs and associated categories consolidated into the Nested Categorical Key Value Pair Collection.

In yet another embodiment, the present invention provides a system for large-scale and rapid parallel Locality Sensitive Hashing of gene sequence Sequence Tokens input data that includes a plurality of processes operational on a plurality of interconnected processors. The plurality of processes including a master process for coordinating the processing of at least one set of gene sequence's Sequence Tokens input data, a set of at least one MinHash Initialization modules, a set of at least one MinHash Producer modules, a set of at least one MinHash Set Item outputs, and worker processes. The master process performing the Locality Sensitive Hashing processing coordination in response to a request to perform the Locality Sensitive Hashing operations, allocating each of the Sequence Token inputs containing small variable length samples of gene sequence text to at least one of the MinHash producer's worker processes. Each of the Locality Sensitive Hashing operations including at least one MinHash Initialization module using a pre-defined Universe Size value to generate non-negative random numbers up to the specified Universe Size used during the creation of a specified number of unique hashing functions each containing a plurality of random numbers used as hashing seeds, wherein each unique hashing function is stored in at least one MinHash delegates collection. Each of the Locality Sensitive Hashing operations including at least one MinHash Producer module comprising a first plurality of worker processes for receiving and hashing each Sequence Token's text or a pre-defined hash value for each Sequence Token's text one time for each unique hashing function contained within the MinHash Delegates collection, wherein at least two of the first plurality of the worker processes perform Locality Sensitive Hashing operations simultaneously in parallel. Each of the Locality Sensitive Hashing operations including at least one SkipDups collection for ensuring that duplicate text values contained within a Gene Token's text are hashed only one time for each unique gene sequence by each of the unique hashing functions contained within the MinHash Delegates collection. Each of the SkipDups collections using SkipDup composite keys comprising a Sequence Token's Sequence ID and text or a pre-defined hash value for a Sequence Token's text to identify duplicate Sequence Tokens within the same gene sequence. Each of the Locality Sensitive Hashing operations including a collection of MinHash Set Items for retaining the minimum hash values produced by each of the unique hashing functions contained within the MinHash delegates collection for each unique gene sequence's Gene Tokens that Locality Sensitive Hashing operations are performed against. Each MinHash Set Item containing one entry for each unique hashing function contained within the MinHash delegates collection or in alternative embodiments only a smaller predefined number of hashing operations can be performed to identify candidate matches before full Min-Hash Sets are produced. Each MinHash Producer in response to receiving a Sequence Token input creating a SkipDup key, determining if MinHashing has been performed, hashing each Sequence Token's text or a pre-defined hash value for a Sequence Token's text one time for each hashing function contained within the MinHash delegates collection or a candidate set of hashing functions in alternative embodiments, and retaining the minimum hash values produced for each unique hashing function within each unique gene sequence in the collection of MinHash Set Item outputs.

In yet another embodiment, the present invention provides a method for mapping gene sequences into Gene Sequence Chunks containing portions of the gene sequence's text broken into individual, independent units of transitional work conducive to simultaneous parallel downstream processing by (a) receiving gene sequences input data containing at least one gene sequence text and possibly one or more categories associated with the gene sequence text; (b) creating one unique Sequence ID per gene sequence means identifying each gene sequence's text with a unique number operable for referring to the gene sequence in one or more associations throughout the system while maintaining only one copy of the gene sequence's text and possibly many copies of the Sequence ID utilized in many associations; (c) creating one unique Category ID per unique category associated with any of the gene sequence's text means identifying each category with a unique number operable for referring to the category in one or more associations throughout the system while maintaining only one copy of the category's text and possibly many copies of the Category ID utilized in many associations; and (d) creating a set of default frequencies means a set of key value pairs comprising one entry for each unique Category ID associated with a unique Sequence ID, wherein a Sequence ID key and at least one value containing a Category ID or nested key value pair including an optional value that contains a default frequency value and/or other relevant values for perform Classification Metric Functions.

In yet another embodiment, the present invention provides a method for mapping gene sequences into Gene Sequence Tokens containing small samples of a gene sequence's text broken into individual, independent units of transitional work conducive to simultaneous parallel downstream processing by (a) receiving gene sequence input data containing at least one gene sequence text or the starting and ending positions of a gene sequence's text, and a gene's Sequence ID; (b) setting the Start Position and Ending Position equal to the first position within the gene sequence's text, or setting the Ending Position equal to the Minimum Token Length, if a Minimum Token Length is used; (c) creating a Sequence Token equal to the text between the current Start and End Positions; (d) setting the End Position equal to the End Position+1; and (e) repeating the specified operations until the Maximum Token Length or the end of gene sequence's text is reached, whichever occurs first.

In yet another embodiment, the present invention provides a method for the locality sensitive hashing of gene sequences by (a) receiving gene sequences input data containing at least one gene sequence text; (b) mapping gene sequences into transitional Gene Sequence Chunks by (1) receiving gene sequences input data containing at least one gene sequence text and possibly one or more categories associated with the gene sequence text, (2) creating one unique Sequence ID per gene sequence means identifying each gene sequence's text with a unique number operable for referring to the gene sequence in one or more associations throughout the system while maintaining only one copy of the gene sequence's text and possibly many copies of the Sequence ID utilized in many associations, (3) creating one unique Category ID per unique category associated with any of the gene sequence's text means identifying each category with a unique number operable for referring to the category in one or more associations throughout the system while maintaining only one copy of the category's text and possibly many copies of the Category ID utilized in many associations, and (4) creating a set of default frequencies means a set of key value pairs comprising one entry for each unique Category ID associated with a unique Sequence ID, wherein a Sequence ID key and at least one value containing a Category ID or nested key value pair including an optional value that contains a default frequency value and/or other relevant values for perform Classification Metric Functions; (c) mapping Gene Sequence Chunks into transitional Gene Sequence Tokens by (1) receiving gene sequence input data containing at least one gene sequence text or the starting and ending positions of a gene sequence's text, and a gene's Sequence ID, (2) setting the Start Position and Ending Position equal to the first position within the gene sequence's text, or setting the Ending Position equal to the Minimum Token Length, if a Minimum Token Length is used, (3) creating a Sequence Token equal to the text between the current Start and End Positions, (4) setting the End Position equal to the End Position+1, and (5) repeating the specified operations until the Maximum Token Length or the end of gene sequence's text is reached, whichever occurs first; (d) receiving each transitional Gene Sequence Token; (e) creating a set of unique hashing functions used for the locality sensitive hashing operations; (f) creating a SkipDup key comprising the Gene Sequence Token's Sequence ID and text or pre-determined text hash value; (g) maintaining a SkipDup key set ensuring that only unique Gene Sequence Token's text or pre-determined text hash values are hashed one time for each unique gene Sequence ID and one time for each of the unique hashing functions used in the locality sensitive hashing operations; (h) maintaining a MinHash Set Item for each unique Sequence ID for which locality sensitive hashing operations are performed; (i) each time a unique Gene Sequence Token and SkipDup key are encountered, determining if a MinHash Set Item exists for the Gene Sequence Token's Sequence ID and creating a new MinHash Set Item for Sequence IDs when needed; (j) each time a unique hashing function produces a minimum hash value, retaining the value within the MinHash Set Item for each unique hashing function; and (k) providing a MinHash Set Item as locality sensitive hashing operations output for each unique Gene Sequence ID for which locality sensitive hashing operations are performed.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
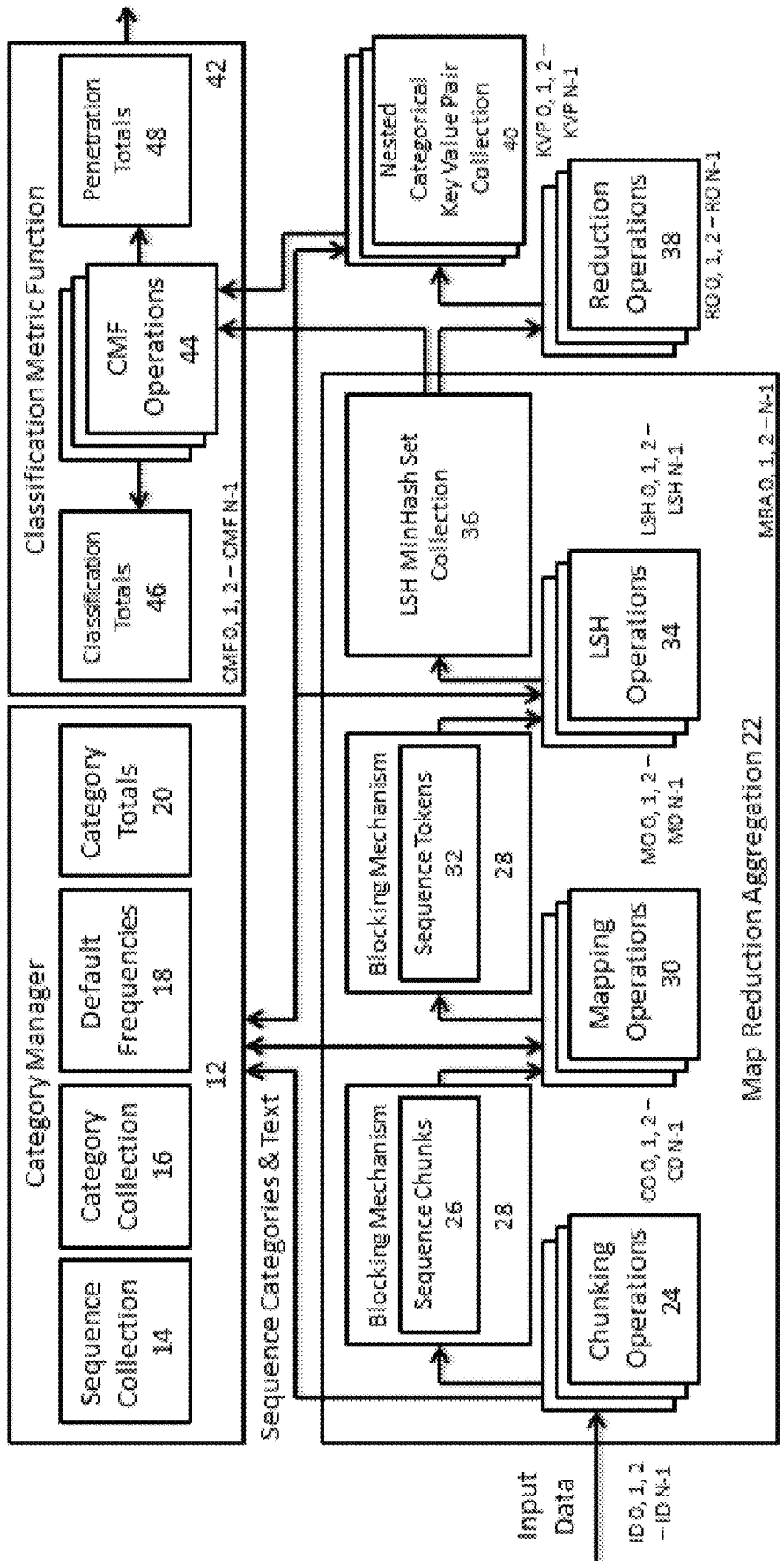
FIG. 1 illustrates a block diagram of a Collaborative Analytics Gene Sequence Classification Learning System in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. For example, the present invention is described with respect to gene sequence data. The present invention, however, is not limited to gene sequence data or the specific design examples described herein.

To facilitate the understanding of this invention, a number of terms are defined below. Terms defined herein have meanings as commonly understood by a person of ordinary skill in the areas relevant to the present invention. The terminology herein is used to describe specific embodiments of the invention, but their usage does not delimit the invention, except as outlined in the claims.

According to one embodiment a Collaborative Analytics Gene Sequence Classification Learning System and Method are provided for the rapid parallel processing, learning, and classification of extremely large volumes of unstructured gene sequence data which allows programmers to create and deploy application specific map reduction aggregation methods and classification metric functions. Map reduction aggregation operations typically comprise at least one or more chunking operations, mapping operations, locality sensitive hashing operations, and possibly reduction operations. Transitional outputs produced by these operations include sequence chunks produced by chunking operations and consumed by mapping operations, sequence tokens produced by mapping operations and consumed by locality sensitive hashing operations, and MinHash set items produced by locality sensitive hashing operations and finally consumed by reduction operations or classification metric function operations.

Some embodiments may specify minimum and/or maximum gene token key lengths within a system to change learning and classification speeds, manage the volume of gene token keys produced during map reduction aggregation, impact the volume of classification metric functions performed during classification, change memory usage within the system, reduce or increase the volume of locality sensitive hashing operations within the system, influence storage or processing requirements for the system, and/or adjust the overall classification accuracy of the system. The preceding list is certainly not comprehensive, but should communicate various ways that changes to the minimum and maximum gene token key lengths can possibly influence the overall performance and accuracy of Collaborative Analytics Gene Sequence Classification Learning Systems and Methods. In systems where minimum and maximum gene token key lengths are not used, the minimum gene token key length is assumed to be 1 and the maximum gene token key length is assumed to be the gene token's text length for the remainder of this document.

Certain embodiments of the invention may deploy chunking operations as the first stage of mapping all gene sequence text into aggregation keys called gene tokens. During chunking operations, each gene sequence is divided into transitional outputs called sequence chunks concordant with the specified chunking operations. Sequence chunks contain portions of the gene sequence input data broken into individual, independent units of intermediate work conducive to simultaneous parallel mapping operations processing. Although sequence chunks could be produced in any number of ways, a typical embodiment's chunking operations divide the gene sequence's text into "chunks" from which many additional gene tokens will be generated in parallel by the mapping operations. Simple gene sequence chunking could be programmatically performed by starting at the first position of a gene sequence's text and capturing all text up to the specified maximum token length or the end of the gene sequence's text, whichever is closer. Additional chunks would then be generated by continuing to positions 2, 3, 4 . . . N–minimum token length (where N=the total length of the gene sequence's text), and capturing all text up to the specified maximum token length or the end of the gene sequence's text, whichever is closer. All sequence chunks would be placed as transitional output into the sequence chunks collection where additional gene tokens would be produced in simultaneously in parallel from each individual sequence chunk by the mapping operations. In alternative embodiments, only chunk starting positions and ending positions within each gene sequence's text would be captured in each sequence chunk to avoid making multiple copies of the gene sequence's text within individual sequence chunks and in main memory.

In particular embodiments where higher processing speeds are preferred, a stagger chunking method could be deployed to reduce the total number of sequence chunks and eventually gene tokens produced within a given system. Using the stagger chunking method, sequence chunks are produced using a first offset to determine the next position for sequence chunk generation within a gene sequence's text. A stagger offset is then used to produce additional sequence chunks containing text which will overlap each breakpoint produced in sequence chunks using the original first offset. It is important to note that specialized mapping operations (described later) also occur which are different than typical mapping operations when stagger chunking is used. Gene sequence stagger chunking could be programmatically performed using steps similar to the following operations:

First Offset Operations
1. Set the current position equal to position 1 and the first offset equal to the maximum token length.
2. Generate a sequence chunk starting at a position equal to the current position of a gene sequence's text and capturing all gene sequence text up to the current position+the first offset value or the end of the gene sequence, whichever is closer.
3. Advance the current position within the gene sequence's text to the previous sequence chunk's ending position+1.
4. Repeat steps 2 and 3 while the current position is less than the length of the gene sequences text.

Stagger Offset Operations
1. Set the stagger offset equal to approximately the first offset value/2 and the current position equal to the stagger offset.
2. Generate a sequence chunk starting at a position equal to the current position of a gene sequence's text and capturing all gene sequence text up to the current position+the first offset value or the end of the gene sequence, whichever is closer.
3. Advance the current position within the gene sequence's text to the previous sequence chunk's ending position+1.
4. Repeat steps 2 and 3 while the current position is less than the length of the gene sequences text.

Some embodiments typically use mapping operations to specify how targeted gene sequence chunks will be further aggregated into data keys called gene tokens within the current system. Each targeted sequence chunk is consistently dissected by mapping operations processes into individual, independent units of intermediate work called sequence tokens typically comprising consistently mapped data keys called gene tokens, possibly values, and/or other information relevant to the current operations. Sequence tokens are stored in the sequence tokens collection and are conducive to simultaneous parallel locality sensitive hashing operations processing. These transitional mapping operations outputs can contain segments of gene sequence text, or starting and ending positions for segments of the gene sequence text in some embodiments, with data key sizes ranging between the minimum and maximum token lengths. Sequence tokens could also contain values representing how many times a unique key occurred, a frequency value weighted by the key length, an aggregated series of value transformations based on a particular key's general importance within a given system, or for capturing any other value modification functions consistent with any number of application specific map reduction aggregation methods. Although sequence tokens could be produced in any number of ways, a typical embodiment's mapping operations further divide sequence chunks into multiple sequence tokens for simultaneous parallel consumption by locality sensitive hashing operations.

A simple mapping operations embodiment could generate the gene token values contained within each sequence token from sequence chunks programmatically by performing steps similar to the following operations:
1. Set the starting position as position 1 and the ending position as position 1 or a position equal to the minimum token length, if a minimum token length is used.
2. Generate a gene token using the sequence chunk's text between the starting position and the ending position.
3. Add 1 to the ending position.
4. Repeat steps 2 and 3 until the maximum token length or the end of the sequence chunk is reached.

An embodiment deploying stagger chunking may use a slightly more complex mapping operations embodiment that could generate the gene token values contained within each sequence token from sequence chunks programmatically by performing steps similar to the following operations:

1. Set the starting position as position 1 and the ending position as position 1 or a position equal to the starting position or the starting position+minimum token length, if a minimum token length is used.
2. Generate a gene token using the sequence chunk's text between the starting position and the ending position.
3. Add 1 to the ending position.
4. Repeat steps 2 and 3 until the maximum token length or the end of the sequence chunk is reached.
5. Reset the starting position as the last starting position+1 and the ending position as the starting position or the starting position+minimum token length, if a minimum token length is used.
6. Repeat steps 2 and 3 until the maximum token length or the end of the sequence chunk is reached.
7. Continue resetting the starting position and ending position incrementing the last position's value by 1 each time until this reset position is equal to the gene sequence's text length–the minimum token length.

Particular embodiments may deploy various forms of application specific Locality Sensitive Hashing operations to drastically reduce the amount of data storage capacity required to learn and classify gene sequence data. In such embodiments, a LSH MinHash Set Collection can be used to maintain a collection of values representing the unique characteristics of each known gene sequence within a system. The locality sensitive hashing operations processes use a pre-determined number of distinct hash functions to hash the unique gene token keys produced during mapping operations processes one time each. As the unique mapping keys are repeatedly hashed, only one minimum resulting hash value for each of the distinct hashing functions are retained across all keys. When the process is completed only one minimum hash value for each of the distinct hashing functions remains in a collection of minimum hash values which represent the unique characteristics of the gene sequence learning or classification input. In certain embodiments, frequency values could also be maintained within the minimum hash value sets to track how many times each unique minimum hash value occurred during locality sensitive hashing operations. The MinHash Set Items within each MinHash Set Collection are stored as independent units of intermediate work typically comprising a Sequence ID and MinHash value collection. Certain embodiments could also contain length and/or frequency collections that provide the length and/or the frequency of each unique key producing a particular minimum hash value. All MinHash Set Items placed in the LSH MinHash Set Collection during locality sensitive hashing operations are stored as independent units of intermediate work which are conducive to simultaneous parallel reduction operations processing or classification metric function operations processing.

In some embodiments, the reduction operations processes continually and simultaneously aggregate or reduce the MinHash Set Items by eliminating the matching minimum hash value keys and aggregating values consistent with the reduction operations for all matching minimum hash value keys which are encountered during reduction operations processing. Sometimes only keys are required during map and/or reduction processing since the value for each encountered key is always assumed to be equal to 1, or a reduction value can be calculated by using only the key itself. However, in other embodiments, a value field may be necessary to maintain how many times a unique key occurred, a frequency value weighted by the key length, an aggregated series of value transformations based on a particular key's general importance within a given system, or for capturing any other value modification functions consistent with any number of application specific map reduction aggregation methods.

Within certain alternative embodiments, longer mapping keys can also be hashed to reduce memory and increase processing speed in a given system. Yet another embodiment specific method of reducing memory and increasing processing speed within a given system would be to only maintain one text copy of each gene sequence input text and produce annotated gene token keys that mark the starting and ending positions of each specific key within the single copy of the gene sequence's text. Multiple stages of mapping and/or reduction can also be used to facilitate increased parallelism, produce final mapping and/or reduction values, or to fulfill other requirements of specific gene sequence mapping and/or reduction method implementations. Once a particular map reduction aggregation method has been provided to a Collaborative Analytics Gene Sequence Classification Learning System and utilized within the system for learning input data of known categories or classification origins, the same map reduction aggregation method is also available for use to aggregate input data of unknown categories or classification origins for the purposes of classification processing.

In some embodiments, map reduction output of known categories or classification origins may be consolidated or further reduced by storing all outputs using similar map reduction aggregation methods in at least one nested categorical key value pair collection of nested key value pairs where the key for each key-value pair maps to a second or nested collection of "categorical" key-value pairs as its value. The collection of "categorical" key-value pairs for each key provides a numerical description of that key across any number of categorical keys contained in the nested "categorical" key-value pair collection. This numerical description is typically created by the reduction operations, and the number of nested categorical key-value pair entries can also vary between the individual mapped entries within the entire collection. Likewise, any corpora of input data collections containing unknown categories or classification origins could also be map reduced into a single nested "categorical" key-value pair collection for the purpose of a performing a combined classification or otherwise.

In embodiments using locality sensitive hashing operations, MinHash Set Collections may be consolidated or further reduced by storing all outputs using similar map reduction aggregation methods in a similar collection of nested key value pairs where the key for each key-value pair maps to a second or nested collection of "categorical" key-value pairs as its value such as the nested categorical key value pair collection described previously. However, the nested categorical key value pair collection could also be partitioned using each distinct hash function within the locality sensitive hashing operations as its partition value. For example, a particular embodiment using 100 distinct hashing functions in its locality sensitive hashing operations may have 100 partitions in its nested categorical key value pair collection indexed 0-99 with index 0 representing all value produced by the first hash function. The partitioning method used should ensure that matching minimum hash values produced by different hashing functions within locality sensitive hashing operations are aggregated as separate values specific to each unique hash function producing the value.

Certain embodiments of the invention may also include one or more classification metric functions to calculate the distance or similarity between at least one resulting map reduction aggregation output and at least one category within the nested categorical key value pair collection. Alternative embodiments could simply calculate the distance or similarity between multiple sets of map reduction aggregation outputs. Classification and/or learning map reduction aggregation outputs are provided to the classification metric function where one or more classification metric similarities or distances are calculated using the values from each individual map reduction aggregation output. Some embodiments use MinHash set items when locality sensitive hashing operations are deployed, and other embodiments may use Sequence Tokens from Mapping Operations when locality sensitive hashing operations are not deployed. When a nested categorical key value pair collection is used to consolidate multiple map reduction outputs, classification metric similarities or distances for a given map reduction aggregation output can be calculated using a single category or plurality of categories represented within the entire nested categorical key value pair collection.

Certain Collaborative Analytics Gene Sequence Classification Learning embodiments utilize a custom classification metric function which weights each matching minimum hash value between two compared sets by the length of the original gene sequence text that produced the matching minimum hash value. This method makes longer matching keys more valuable than shorter matching keys and increases accuracy within some classification metric function embodiments. However, the lengths for each minimum hash value do not have to be stored within a consolidated nested categorical key value pair collection to perform such classification metric function calculations. When a gene sequence is being classified, the lengths for each minimum hash value can be captured during those locality sensitive hashing operations and added to the transitional MinHash Set Item outputs. Since any matching minimum hash values obtained from the nested categorical key value pair collection will also be contained within the MinHash item set, the lengths from this set can be referenced during the classification metric function operation calculations.

Formally, the classification metric function calculation for a typical Collaborative Analytics Gene Sequence Classification Learning embodiment is as follows:
Let $S_x$ and $S_y$ be two gene sequences. Let X and Y be the sets of mapped keys in the two gene sequences $S_x$ and $S_y$, respectively. Given a mapped key $z \in S_x$, let $f(z, S_x)$ be the frequency of the mapped key within the sequence $S_x$. Given a mapped key $z \in S_y$, let $f(z, S_y)$ be the frequency of the mapped key within the sequence $S_y$. Let $l(z)$ be the length of the mapped key z. The similarity between two sets of mapped keys X and Y is defined as the Length Weighted Frequency Jaccard where:

$$LWFJ(S_x, S_y) = \frac{\sum_{z \in X \cap Y}(f(z, S_x) + f(z, S_y)) * l(z)}{\sum_{z \in X \cup Y} f(z, S_x) + f(z, S_y)}$$

However, in certain embodiments where locality sensitive hashing operations are used, or any other situation occurs where all sets contain a very similar number of items, the similarity between two sets X and Y can be defined as the Length Weighted Frequency Intersection where:

$$LWFI(S_x, S_y) = \sum_{z \in X \cap Y}(f(z, S_x) + f(z, S_y))$$

In some embodiments and when a higher performance classification metric function is required and sets contain a dissimilar number of items, the similarity between two sets X and Y can be defined as a Simple Length Weighted Frequency Jaccard where:

$$SLWFJ(S_x, S_y) = \frac{\sum_{z \in X \cap Y} f(z, S_y) * l(z)}{\sum_{z \in Y} f(z, S_y)}$$

Yet, in other embodiments where a higher performance classification metric function is required and locality sensitive hashing operations are used or any other situation occurs where all sets contain a very similar number of items, the similarity between two sets X and Y can be defined as a Simple Length Weighted Frequency Intersection where:

$$SLWFI(S_x, S_y) = \sum_{z \in X \cap Y} f(z, S_y) * l(z)$$

In certain embodiments of the invention where locality sensitive hashing operations are deployed, the classification metric function uses only minor modifications to the formulas described above. First a mapping is defined as X'=MinHash(X), where the function MinHash computes the set of the minimum hash values generated for each mapped key using a family of hashing functions. The number of collisions between the MinHash values of the two sequences gives an estimate of the Length Weighted Frequency Jaccard using the following modifications:
Let $S_x$ and $S_y$ be two gene sequences. Let X' and Y' be the sets of minimum hash values generated for each mapped key z in the two gene sequences $S_x$ and $S_y$, respectively. Given a minimum hash value $Z_h \in S_x$, let $f(Z_h, S_x)$ be the frequency of the minimum hash value within the sequence $S_x$. Given a mapped key $Z_h \in S_y$, let $f(Z_h, S_y)$ be the frequency of the minimum hash value within the sequence $S_y$. Let $l(z)$ be the length of the mapped key z producing the minimum hash value $Z_h$. The similarity between two sets of minimum hash values X' and Y' is defined as the Length Weighted Frequency Jaccard where each formula described previously is modified in the following manner:

$$LWFJ(S_x, S_y) = \frac{\sum_{z_h \in X' \cap Y'}(f(Z_h, S_x) + f(Z_h, S_y)) * l(z)}{\sum_{z_h \in X' \cup Y'} f(Z_h, S_x) + f(Z_h, S_y)}$$

$$LWFI(S_x, S_y) = \sum_{Z_h \in X' \cap Y'}(f(Z_h, S_x) + f(Z_h, S_y))$$

$$SLWFJ(S_x, S_y) = \frac{\sum_{Z_h \in X' \cap Y'} f(Z_h, S_y) * l(z)}{\sum_{Z_h \in Y} f(Z_h, S_y)}$$

$$SLWFI(S_x, S_y) = \sum_{Z_h \in X' \cap Y'} f(Z_h, S_y) * l(z)$$

In some embodiments, a blocking mechanism may be used for at least one transitional output storage area. The blocking mechanism manages the potential differences in the production and consumption speeds between chunking, mapping, locality sensitive hashing, reduction, and classification metric function operations. In this type of embodiment the transitional blocking mechanism is notified that transitional output production has started. Production workers produce transitional outputs while consumption workers consume the transitional outputs until the blocking mechanism is notified by the production process that production of all transitional outputs has completed. Consumption workers also continue working until production has completed and all transitional outputs have been consumed. In the event that there are no transitional outputs to consume and production has not completed, the blocking mechanism allows consumers to "block" or wait until additional transitional outputs are produced. Memory consumption can also be managed within the blocking mechanism by setting a predetermined production capacity. When the production capacity is exceeded, the blocking mechanism allows production workers to stop production and "block" or wait until additional transitional outputs are consumed and the transitional output count falls back below the pre-determined production capacity. Any Collaborative Analytics Gene Sequence Classification Learning Systems and Methods creating transitional outputs could act as producers and/or consumers interacting with multiple blocking mechanisms participating in multiple production and consumption relationships.

Certain embodiments may include a category manager used to manage all known categories and/or gene sequences within the system and to track all gene sequence input data processed by the system. The category manager typically comprises at least one sequence collection, category collection, category totals collection, and a category default frequencies collection. Sequence collections typically contain information about known or learned gene sequences within the system. At a minimum, this could include a unique sequence ID for each known gene sequence. The sequence ID is used to associate each known gene sequence with any number of category IDs contained in the category collection, default frequencies collection, and the nested categorical key value pair collection when used. Sequence ID's can associate gene sequences with categories when and wherever needed using the least amount of memory and disk space possible by utilizing a category's category ID instead of making multiple copies of the category name.

Particular embodiments sequence collections may maintain a single copy of each gene sequence's original text which is associated with the sequence ID. The single original text copy can be used in conjunction with gene sequence text annotations, such as annotated sequence chunks and sequence tokens, to improve performance and reduce memory consumption within the system. During mapping operations, the gene sequence's keys called gene tokens are mapped simply by recording the starting and ending positions of the gene token within the single original text copy. In addition, very large gene sequences such as the human genome could be partitioned into any number of segments for both learning and classification. Partitions could be assigned unique sequence IDs or share the same sequence ID and be given unique partition numbers within the sequence collection. When using such a system, gene sequences of any length could be learned or classified against including portions of individual gene sequences within partitions. For example, once a mutated or defective portion of a gene sequence has been learned by the system, all partitions of a human genome could be classified against the mutated or defective sequence to identify partitions most similar to the mutated or defective sequence.

Embodiments processing very large individual gene sequences or very large numbers of gene sequences could maintain virtually unlimited amounts of information about sequences within at least one sequence collection database. During all operations requiring specific gene sequence information or text, the required information could be loaded into memory for processing. The sequence collection database could contain information such as the gene sequence full name, fasta identification number, kingdom, phylum, class, order, family genus, species, and any other information relevant to a particular gene sequence within a system. It is preferred that all gene sequence data required for map reduction aggregation and classification metric function operations be entirely available in memory during these operations as disk I/O destroys the performance of the entire system.

As new category names are encountered within some embodiments, each unique category name is assigned a unique category ID number. The unique category ID number is used to associate each known gene sequence category with any number of gene sequence keys called gene tokens or entire gene sequences using the sequence ID, either of which are identified during various map reduction aggregation operations. Category IDs can be contained in the category collection, default frequencies collection, category totals collection, classification totals collection, penetration totals collection, the nested categorical key value pair collection, or within any other structure requiring category associations or categorical information in the system.

Alternative embodiments may use a default category frequency collection to maintain the default categories and/or frequencies associated with each known gene sequence within the system. The default category frequencies can be used to serve as a single copy of the category associations between a unique gene sequence ID and any number of category IDs contained within the default category frequencies collection. Each entry within the default category frequency collection contains key value pair with a sequence ID key and a nested collection of keys or key value pairs as its value, wherein the nested collection of keys contains as least one category ID and the optional values could contain associated category default frequencies and/or additional data relevant for describing the relationship between a sequence ID and a particular category ID. Each time a new gene token key or minimum hash value key is encountered during map reduction aggregation consolidation into the nested categorical key value pair collection, the gene sequence's default category frequencies are copied and used as the starting nested categorical key value pair's value within the nested categorical key value pair collection. Using a default frequency collection can dramatically improve learning performance by simply copying the same default frequency collection for each unique gene token identified within a given gene sequence instead of rebuilding the default collection in each instance. Each time a gene sequence's associated categories are required, the associated category IDs can be quickly accessed from the default frequencies collection using a specific sequence ID.

Particular embodiments of the invention for the rapid processing of extremely large volumes of gene sequence input data can include a plurality of map reduction aggregation workers which are coupled to individual processors on one or more computing devices participating in a distributed parallel processing environment. While chunk workers are performing chunking operations, transitional sequence chunk outputs are placed into centralized storage areas accessible to mapping operations workers. Simultaneously, mapping workers are performing mapping operations and placing transitional mapping outputs in the form of sequence tokens into centralized storage areas accessible to locality sensitive hashing operation workers. The locality sensitive hashing operations workers are consuming the sequence chunks and producing MinHash set items which are centrally located within LSH MinHash Set Collections and accessible to reduction operations workers when consolidation into the nested categorical key value pair collection is required. Simultaneously, reduction operations workers are consuming the transitional MinHash set items output, reducing the keys, and integrating the values consistent with the specified reduction operations. During classification, classification metric function workers are consuming the transitional MinHash set items output and performing one or more distance and/or similarity calculations concordant with the specified classification metric function operations. All chunking, mapping, locality sensitive hashing, reduction, and classification metric function operations are occurring concurrently in tandem while acting as producers, consumers, or both in a highly parallel production pipeline.

Alternative invention embodiments designed for large scale parallel processing may include multiple computing and/or storage devices interconnected though a network comprising at least one device receiving input data, at least one device performing chunking operations, at least one device performing mapping operations, at least one device performing locality sensitive hashing operations, at least one device performing reduction methods, and at least one device performing classification metric function operations. Any devices in this system containing chunk workers could perform chunking specific operations placing transitional sequence chunk outputs into centralized storage areas accessible to devices containing mapping operations workers. Simultaneously, devices in this system containing map workers are performing mapping operations and placing transitional mapping outputs in the form of sequence tokens into centralized storage areas accessible to devices containing locality sensitive hashing operations workers. The devices containing locality sensitive hashing operations workers are consuming the sequence chunks and producing MinHash set items which are centrally located within devices containing LSH MinHash Set Collections and accessible to devices containing reduction operations workers. Simultaneously, any devices containing reduction operation workers are consuming any completed transitional MinHash set items output, reducing the keys, and integrating the values consistent with the specified reduction operations into a nested categorical key value pair collection. During classification, any devices containing classification metric function workers are consuming the transitional MinHash set items output and performing one or more distance and/or similarity calculations concordant with the specified classification metric function operations. All devices containing chunking, mapping, locality sensitive hashing, reduction, and classification metric function operations are performing these operations concurrently in tandem while acting as producers, consumers, or both in a large scale parallel processing production pipeline.

Certain embodiments of the invention may include one or more technical advantages. A technical advantage of the embodiment includes allowing programmers to create and deploy application specific map reduction aggregation methods within a Collaborative Analytics Gene Sequence Classification Learning System. Application specific map reduction aggregation methods flexibly support processing unstructured gene sequence data in an unlimited number of ways during both learning and classification processing. For example, gene sequences could be both learned and classified via application specific map reduction aggregation using as aggregation keys: gene tokens created by chunking, stagger chunking or any other method conceived by the map reduction aggregation method creator. In addition, minimum and maximum token lengths could be modified to influence both the performance and accuracy of a particular system. Another technical advantage of an embodiment provides allowing programmers to create and deploy application specific classification metric functions within a Collaborative Analytics Gene Sequence Classification Learning System. Application specific classification metric functions flexibly support comparing the similarity or distance (dissimilarity) between application specific map reduction aggregation method outputs of unstructured gene sequence data in a myriad of ways during both learning and classification processing. For example, gene sequences could be compared for similarity and/or distance (dissimilarity) using as a classification metric function: Length Weighted Frequency Jaccard, Length Weighted Frequency Intersection, Simple Length Weighted Frequency Jaccard, Simple Length Weighted Frequency Intersection, or any other method conceived by the classification metric function creator. Yet another technical advantage of an embodiment provides the rapid learning and classification of gene sequence data into one or more known categories or classification origins using the parallel processing of map reduction aggregation methods and classification metric functions. The parallel processing of map reduction aggregation methods and classification metric functions allows performing multiple stages of learning or classification simultaneously by dividing up learning and classification work into individual independent units of work which facilitate concurrent and rapid parallel processing all stages.

FIG. 1 illustrates an exemplary Collaborative Analytics Gene Sequence Classification Learning System 10 which is used for the machine learning and classification of extremely large volumes of gene sequence input data. It should be appreciated that the layout of system 10 is merely exemplary, and the system 10 may take on any other suitable layout or configuration. In general, the embodiments described herein can be performed by one or more processors that are connected by one or more networks. Processors may reside on one or more computers that could include a server, workstation, personal computer, lap top, wireless or cellular telephone, personal digital assistant, or any other device (wireless, wireline, or otherwise) capable of receiving, possessing, storing, and/or communicating information with other components of a system 10. The system 10 represents an application independent framework for the parallel learning and classification of gene sequence data which may run on multiple devices and across one or more distributed networks.

Input Data and Pre-Processing

System 10 receives at least one set of input data ID0-ID N−1, where N represents any suitable number, which includes gene sequence text and can also include one or more associated categories and any other information relevant to each specific gene sequence text. Relevant gene sequence information could include data such as the gene sequence full name, fasta identification number, kingdom, phylum, class, order, family genus, species, and/or any other inputs relevant to a particular gene sequence within the system 10 which is expected as valid input by the system 10. Invalid gene sequence input provided to the system 10 could be disregarded or trigger an error as directed by the system 10's application programmer. Input data pre-processing is performed prior to the map reduction aggregation 22 processes or as an initialization stage during map reduction aggregation 22.

During input data pre-processing, individual gene sequence text and associated categories are identified for each gene sequence within the input data ID0-ID N−1. The input data ID0-ID N−1 could include, at a minimum, gene sequence input data and/or associated categories located within a database, input files, and/or a website or computer device operable to receive and process gene sequence data entered by and presented to the user. Although one set of input data ID0-ID N−1 may contain any number of gene sequences and/or associated categories for either classification or learning, input data pre-processing separates the individual gene sequence inputs managing how many individual gene sequence inputs are loaded into main memory for simultaneous map reduction aggregation 22 processing. When multiple map reduction aggregation 22 processes are used, the input data is also distributed as input to each individual map reduction aggregation 22 process. Each unique gene sequence's text and associated categories are provided to the category manager 12 for pre-processing, and each unique gene sequence's text is then provided to map reduction operations 22 for map reduction aggregation 22 processing.

Category Manager

Each unique gene sequence identified during input data pre-processing is assigned a unique gene sequence ID used for reference and identification during all remaining stages of system 10 processing. The sequence ID can also be used to refer to the gene sequence's original text as needed in certain embodiments. Sequence IDs are typically associated with each gene sequence's text and any other information relevant to a specific gene sequence which is maintained by the category manager 12 within the sequence collection 14. The category manager 12 generally manages all unique categories and gene sequences known within the system 10 and tracks all gene sequence input data processed by the system 10. The category manager 12 comprises at least one sequence collection 14, category collection 16, category totals collection 20, and a category default frequencies collection 18. It is preferred that all sequence collection 14, category collection 16, category totals 20, and default frequencies 18 data required for processing be loaded into main memory during both map reduction aggregation 22 and classification metric function 42 processing as disk I/O destroys system 10 processing speed and performance.

Each sequence collection 12 contains information about known gene sequences within the system. At a minimum, this could include a unique sequence ID for each known gene sequence. The sequence ID is used to associate each known gene sequence with any number of category IDs contained in the category collection 16, default frequencies 18, category totals 20, classification totals 46, penetration totals 48, and the nested categorical key value pair collection 40 when used. In a simple embodiment, the sequence collection 14 could comprise a single key value pair data structure using a sequence ID as its key and the gene sequence text as its value located entirely in main memory. However in more robust embodiments, the sequence collection 14 could represent a large database containing multiple tables of data relevant to individual gene sequences. Yet in other embodiments, the sequence collection 14 could represent a collection of files or serialized data structures containing relevant gene sequence information which is loaded into main memory as needed for system 10 processes. Sequence ID's can associate gene sequences with categories when and wherever needed within the system 10 while using the least amount of main memory and disk space possible.

In the illustrated embodiment, all categories associated with an individual gene sequence are provided to the category manager 12 during input data pre-processing, and any unique categories are assigned a unique category ID and maintained within at least one category collection 16. In a simple embodiment, the category collection 16 could comprise a single key value pair data structure using a category ID as its key and the category name as its value located entirely in main memory. A second key value pair data structure using a category name as its key and the category ID as its value could be used to provide rapid category access using either category names or category IDs as needed by the system 10. More robust embodiments could use a category collection 16 managed within a large database containing multiple tables of data relevant to individual categories. Yet in other embodiments, the category collection 16 could represent a collection of files or serialized data structures containing relevant gene sequence category information which is loaded into main memory as needed for system 10 processes.

Once all categories associated with an individual gene sequence are provided to the category manager 12 during input data pre-processing, a set of default categories are created for each unique gene sequence encountered during learning processes. Default category frequency sets are maintained within the default frequencies 18 collection and subsequently copied each time a new gene token is identified within a gene sequence's text during the reduction operations 38's consolidation of a map reduction aggregation 22's transitional outputs into a nested categorical key value pair collection 40. A default category frequency set includes a collection of key value pairs where each entry contains a sequence ID key and a nested collection of keys or key value pairs as its value, wherein the nested collection of keys contains as least one category ID and the optional values could contain associated category default frequencies and/or additional data relevant for describing the relationship between a sequence ID and a particular category ID. In particular embodiments where optional values are not used, the default category set may only contain keys representing each unique category ID associated with a gene sequence. Yet in other embodiments, default category set values could always contain a starting frequency value equal to 1 or certain categories could be given greater importance by increasing the starting frequency value as needed. Each time a new gene sequence token key is encountered during map reduction aggregation 22, the gene sequence's default category set is copied from the default frequencies collection 18 and used as the starting nested categorical key value pair's value within the nested categorical key value pair collection 40. Using a simple embodiment, the default frequencies collection 18 could comprise a single collection of sequence IDs with category IDs and default frequencies as its value located entirely in main memory. More robust embodiments could use default frequency collections 18 managed within a large database containing multiple tables of data relevant to individual gene sequence's default categories and frequencies. Yet in other embodiments, the default frequency collections 18 could represent a collection of files or serialized data structures containing relevant gene sequence's default categories and frequencies which are loaded into main memory as needed for system 10 processes.

The category manager 12 also includes a category totals collection 20 containing the category frequency grand totals for each unique category ID number when category frequencies are used, or the count of unique keys associated with a category when frequencies are not used. The category frequency totals represent the general size of each unique category ID within the nested categorical key value pair collection. This value is also used to during classification metric functions 42 to calculate the penetration totals 48 described later. In a simple embodiment, a category totals collection 20 may include a collection of key value pairs with each key representing a valid category ID number and each value representing a frequency total for each category ID. When locality sensitive hashing operations 34 are used, embodiment values in the category totals collection 20 may represent the total number of times various minimum hash values are encountered for a particular category ID. When gene tokens, hashes of gene tokens, or gene token annotations are used, embodiment values in the category totals collection 20 may represent the total number of times various gene token values are encountered for a particular category ID. More robust embodiments could use a category totals collection 20 managed within a large database containing multiple tables of data relevant to individual category totals. Yet in other embodiments, the category totals collection 20 could represent a collection of files or serialized data structures containing relevant gene sequence category totals information which is loaded into main memory as needed for system 10 processes.

Particular category manager 12 embodiments may utilize special category ID values which signify a particular meaning within certain system 10 collections. For example, the category ID value "−1" may signify a placeholder category containing totals for a specific gene token key or minimum hash value key within the nested categorical key value pair collection 40's value. Likewise, a key with a value equal to "−1" within the same nested categorical key value pair collection 40 may contain a nested categorical key value pair collection containing frequency totals for all categories in the nested categorical key value pair collection 40. Furthermore, a key equal to "−1" in the category totals 20 collection could contain a value with a grand total for all categories within the category totals collection 20 for a given system 10 embodiment. Finally a key value equal to "−1" in the default frequencies 18 collection may signify a placeholder category containing frequency totals for a specific default frequencies collection which is copied each time a new entry within the nested categorical key value pair collection 40 is identified and then becomes the frequency total for the new entry in the nested categorical key value pair collection 40.

Map Reduction Aggregation

As shown in FIG. 1, input data ID0-ID N−1 are processed by at least one first set of processes, herein referred to as map reduction aggregation 22, to produce a set of transitional outputs which represent the unique characteristics of the gene sequence input data. The map reduction aggregation 22 process typically comprises at least one or more chunking operations 24, mapping operations 30, locality sensitive hashing operations 34, and reduction operations 38. Transitional outputs produced by these operations include sequence chunks 26 produced by chunking operations 24 and consumed by mapping operations 30, sequence tokens 32 produced by mapping operations 30 and consumed by locality sensitive hashing operations 34, and MinHash set items 64 (FIG. 2) produced by locality sensitive hashing operations 34 which are contained within the MinHash set collection 36, and finally consumed by reduction operations 38. The transitional outputs produced by reduction operations 38 are conducive to consumption as data inputs by the classification metric function 42 processes during classification and/or as data inputs for consolidation into the nested categorical key value pair collection 40 by the reduction operations 38 during learning.

Figures 2, 3:
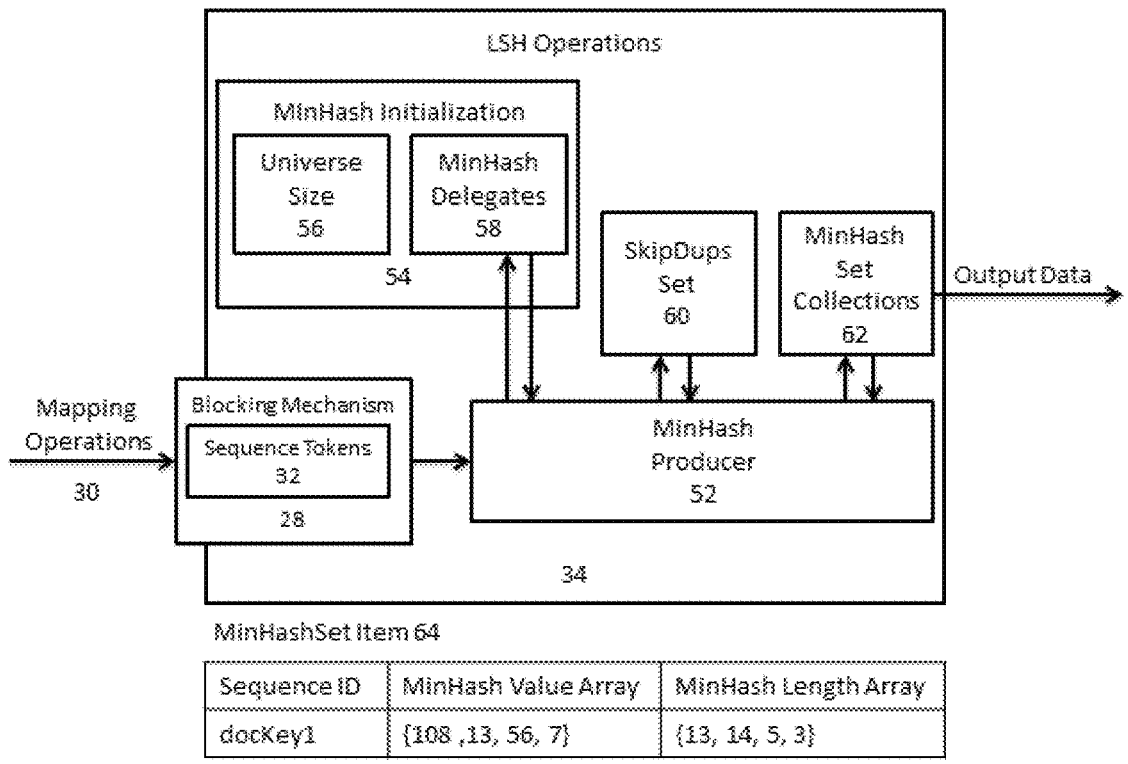
FIG. 2 illustrates a block diagram of a Locality Sensitive Hashing Operations MinHash System and is intended to represent the LSH Operations 34 (FIG. 1) in accordance with one embodiment of the present invention.
FIG. 3 illustrates sample Sequence Chunk and Sequence Token Data Structure Embodiments in accordance with one embodiment of the present invention.

In some embodiments, transitional outputs from multiple map reduction aggregation 22 processes could be either consolidated into at least one nested categorical key value pair collection 40 during learning, and/or passed to classification metric function 42 for classification against pre-existing categories within the nested categorical key value pair collection 40 during classification, or merely processed by the classification metric function 42 for either distance or similarity calculations between multiple map reduction aggregation 22 transitional outputs. When locality sensitive hashing operations 34 are used, map reduction aggregation 22 transitional outputs are produced in the form of MinHash set items 64 (FIG. 2) and located in the MinHash set collection 36. However, when locality sensitive hashing operations 34 are not used, map reduction aggregation 22 transitional outputs are produced in the form of sequence tokens as shown in FIG. 3.

Sequence Chunking

Map reduction aggregation 22 embodiments can include at least one chunking operations 24. The chunking operations 24 comprise chunk workers operating in parallel on one or more gene sequence's text identified from gene sequence input data ID0-ID N−1 and loaded into main memory during the pre-processing stage. During chunking operations, each gene sequence is divided into transitional outputs called sequence chunks as shown in FIG. 3 concordant with the specified chunking operations 24 (FIG. 1). Gene sequence input data ID0-ID N−1 can include a variety of data types and representations typically included in data processing systems. The gene sequence input data can include text files, database record I/O, sorted data structures, B-trees, Dictionaries, tables, indexed tables, and/or others. Gene sequence categories could comprise alpha and or numeric characters and various types of delimiters or file layouts as expected by various system 10 input data pre-processing and/or chunking operations 24 embodiments. A gene sequence's input text may comprise a relatively small set of repeated characters such as T,A,G,C, and R that may be digitally represented within the input data in a variety of ways including ASCII, Unicode, Binary, or other types of digital encoding. In addition, the gene sequence input text may vary greatly in lengths depending on the types of input data being learned or classified. For example, individual gene sequences such as the human genome may take up to 4 gigabytes of space in total but could be broken into many thousands of smaller partitions containing parts of the genome's text. Some system 10 embodiments may specify minimum and/or maximum gene token key lengths for the purposes of impacting the total number of sequence chunks, sequence tokens, and gene token keys generated by a particular system 10 embodiment. In systems where minimum and maximum gene token key lengths are not used, the minimum gene token key length is assumed to be 1 and the maximum gene token key length is assumed to be the gene token text's total length. The minimum and/or maximum gene token lengths determine the minimum and maximum sizes of gene sequence text represented in both a sequence chunk and sequence token transitional output embodiments represented in FIG. 3.

Figure 4:
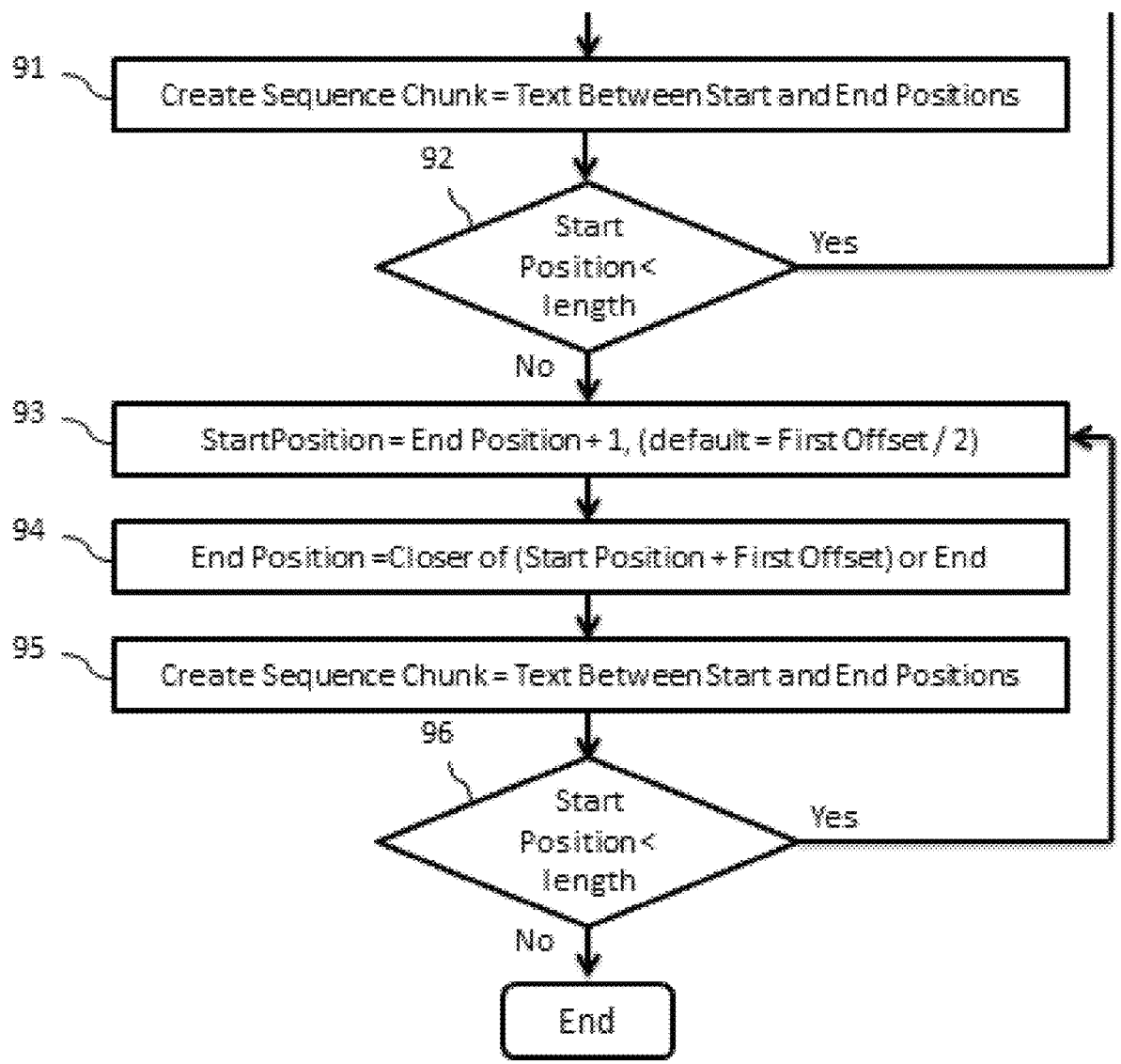
FIG. 4 illustrates a flow diagram of a Sequence Chunking Method in accordance with one embodiment of the present invention.

FIG. 4 illustrates a diagram of a Sequence Chunking Method 80 which occurs during chunking operations 24 as part of the map reduction aggregation 22 operations in the FIG. 1 embodiment. The chunking operations 24 are the first stage of mapping all gene sequence text into aggregation keys called gene tokens using the sequence chunking method 80 (FIG. 4) which may sometimes include sequence ID assignment 81, category identification 82, and default frequency creation 83, if these steps were not previously completed as part of an input data pre-processing stage. In system 10 (FIG. 1), when unknown gene sequence input data ID0-ID N−1 is encountered, all gene sequence information is provided to the category manager 12 where the gene sequence is assigned a unique sequence ID and all relevant gene sequence information is added to the sequence collection 14. This process is also represented as step 81 in FIG. 4. New category names are also sent to the category manager 12 and assigned unique category IDs within the categories collection 16. This process is also represented as step 82 in FIG. 4. All relevant gene sequence category association information is then added to a default category frequency set, and this set is added to the default frequencies 18 collection. This process is also represented as step 83 in FIG. 4. Additional details about the category manager 12, sequence collection 14, categories collection 16, and default frequencies 18 collection structures can be located within the Detailed Description's Category Manager Section.

FIG. 4 illustrates an exemplary Sequence Chunking Method 80 which is used for the dividing of gene sequence input text into sequence chunks as depicted in FIG. 3. It should be appreciated that the layout of the Sequence Chunking Method 80 is merely exemplary, and the Sequence Chunking Method 80 may take on any other suitable layout or configuration. Using the Sequence Chunking Method 80, portions of a gene sequence's text are mapped into "chunks" from which many additional gene tokens will be generated in parallel by the mapping operations. When stagger chunking is not deployed, step 84 executes a simple chunking operation on the gene sequence's text that divides the gene sequence's text into "chunks" from which many additional gene tokens will be generated in parallel by the mapping operations. When stagger chunking is deployed, step 84 executes a stagger chunking operation on the gene sequence's text that also divides the gene sequence's text into "chunks". However, the stagger chunking operation produces far less sequence chunks and far less resulting downstream sequence tokens as compared to the simple chunking operation when using the same minimum and maximum token lengths.

During the FIG. 4 steps 85-88 simple sequence chunking occurs where a sequence chunk is generated from each character within a gene sequence's text unless excluded by a minimum or maximum token length. In step 85, a Start Position is set equal to the current Start Position+1, wherein the StartPosition's default value begins at position 0. An End Position is set equal to the Start Position+a pre-defined Maximum Token Length, or the last position in the gene sequence's text, whichever is closer during step 86. Step 87 then creates a Sequence Chunk equal to the text between the current Start and End Positions. While step 88 continues this process producing additional sequence chunks by repeating steps 85-87 until the Start Position is less than the gene sequence's text length–the minimum token length. Alternative embodiments only capture the starting and ending positions of the sequence chunk text within a single copy of the gene sequence's text which can later be referenced as needed from the category manager 12's sequence collection 14. Sequence chunking occurs in parallel on at least two processors and one or more computing devices to rapidly produce the transitional sequence chunk outputs as displayed in FIG. 3.

Stagger Chunking

When stagger chunking (Sequence Chunking Method 80 FIG. 4) is deployed, step 84 executes a stagger chunking operation on the gene sequence's text to produce a reduced volume of total sequence chunks from each unique gene sequence provided. Sequence chunk production steps 89-92 creates sequence chunks using a first offset to determine the next position for sequence chunk generation within a gene sequence's text. The stagger sequence chunk production steps 93-96 then use a stagger offset to produce additional sequence chunks containing text which will overlap each breakpoint occurring in sequence chunks produced by the original sequence chunk steps 89-92 production process. Certain embodiments determine the first offset's value by using the maximum token length's value as the value for the first offset. Other embodiments use a specific first offset value optimized to produce a desired number of total sequence chunks which is dependent on the estimated lengths of the gene sequence input text being processed. For example, assume around 15 total sequence chunks are desired from the sequence chunk production steps 89-92 process for each gene sequence input, and the average length of gene sequence input text will be approximately 1500 characters. A first offset value of 100 characters could be used to produce a total of 15 first offset sequence chunks during the sequence chunk steps 89-92 production process using the previous assumptions. The stagger sequence chunk production steps 93-96 operations would produce 14 addition sequence chunks with gene sequence text overlapping each of the 14 breakpoints occurring in the first set of sequence chunks produced during the sequence chunk steps 89-92 production process. Since gene tokens are produced from each sequence chunk, the total gene tokens produced are directly impacted by the total number of sequence chunks produced.

Once the first offset has been determined, the sequence chunk steps 89-92 production process generates a set of sequence chunks as shown in FIG. 3 using the first offset to limit the maximum size and number of sequence chunks produced. During step 89, a start position is always set equal to the current end position+1, wherein the start position's default starting value begins at position 0. Step 90 sets an end position equal to the start position+the pre-determined first offset value, or the last position in the gene sequence's text, whichever is closer. A Sequence Chunk is then created using the text between the current start and end positions in Step 91. This process is repeated while the current start position is less than the gene sequence text length, and step 92 performs an inspection which ends the process when the gene sequence text length is exceeded. In alternative embodiments, only chunk starting position and ending position numbers within each gene sequence's text would be captured in each sequence chunk to avoid making multiple copies of the gene sequence's text within individual sequence chunks and in main memory.

The stagger offset is generally determined by dividing the value of the first offset by 2 and truncating or rounding this value to remove any decimal places. Once the stagger offset has been determined, the stagger sequence chunk steps 93-96 production operations generate a set of staggered sequence chunks as shown in FIG. 3 using the first offset to limit the maximum size and number of sequence chunks produced and using the stagger offset to ensure that each stagger chunk's gene sequence text overlaps all breakpoints created during the sequence chunk steps 89-92 production process by using the first offset. Setting the beginning current position equal to the stagger offset value, the first offset is again used as described before to create a second set of staggered sequence chunks. The staggered sequence chunks include portions of the gene sequence text most impacted by all break points created within the sequence chunk steps 89-92 production process. The addition of the stagger chunks also improves accuracy over using only the first offset sequence chunks when stagger chunking is deployed.

Sequence Chunks

In some embodiments, such as system 10 (FIG. 1), chunking operations 24 produce all sequence chunks in parallel using at least two processors on at least one computing device. The sequence chunks are transitional outputs resulting from the chunking operations 24 and act as individual, independent units of work conducive to simultaneous parallel mapping operations 30 processes. Some embodiments could produce both the sequence chunk steps 89-92 production operations and the stagger sequence chunk steps 93-96 production operations simultaneously using multiple chunking worker threads when the stagger chunking operations are deployed. In system 10 (FIG. 1), all transitional sequence chunk outputs are placed into at least one centrally accessible sequence chunks collection 26 which is managed by an instance of a blocking mechanism 28. The sequence chunks collection 26 can contain various sequence chunk embodiments as displayed in Sequence Chunk and Sequence Token Data Structure Embodiments 66 (FIG. 3). In one sequence chunk embodiment 68, the sequence chunk contains a sequence ID which uniquely identifies its parent gene sequence, a category array representing all the categories associated with the sequence ID, and a text field containing a "chunk" of the gene sequence's text. In preferred alternative embodiments, all associated categories can be quickly accessed using the sequence ID to identify the appropriate default frequencies collection, which contains all associated categories, within the category manager 12's default frequency 18 collection. This would allow the system 10 to maintain only one single copy of a gene sequence's associated categories per sequence ID. Using this alternative embodiment, a category array would not be required for either sequence chunks or sequence tokens. Another preferred sequence chunk embodiment 70 shows a "chunk" of the gene sequence's text represented by a "chunk" annotation. The "chunk" annotation uses a starting and ending position or chunk length to identify a sequence chunk's text. During chunking operations 24 and mapping operations 30 processes, actual text for the chunk annotation would be quickly located within the category manager 12's sequence collection 14 which would contain a single copy of each gene sequence's full input text which is indexed by the sequence ID.

Blocking Mechanisms

Certain system 10 embodiments contain one or more blocking mechanism 28 instances which can be implemented as objects and/or classes defined by the application programmer using known object oriented programming techniques. Application programmers can possibly derive other classes from the blocking mechanism 28 base class and instantiate the blocking mechanism 28 base class as one or more objects in a particular system 10 embodiment. The blocking mechanism 28 includes the ability to encapsulate at least one base collection of items, receive notification from at least one producer thread of starting production into the base collection of items, receive notification from at least one producer thread for ending production into the base collection of items, one method for adding items into the base collection of items, one method for removing items from the base collection of items, and one consuming enumeration accessible to at least one consumer thread for consuming items from the encapsulated base collection. Base collections could be implemented as bags where insertion and removal order is not managed in any particular order or queues where insertion and removal order is managed using LIFO (last in first out), FIFO (first in first out) or other acceptable queuing techniques.

Sequence Chunks Collection and Blocking Mechanism

At least one instance of the blocking mechanism 28 is used to manage the potential differences in speed between sequence chunk production into the sequence chunks 26 collection by the chunking operations 24 and sequence chunk consumption from the sequence chunks 26 collection by the mapping operations 30. According to the system 10 (FIG. 1), the sequence chunks 26 collection is implemented using a thread-safe bag approach. This embodiment favors sequence chunk processing speed over any particular insertion or removal processing/queuing order. Many chunking operations 24 worker threads can add sequence chunk items to the sequence chunks 26 collection while many mapping operations 30 workers are concurrently removing items from the sequence chunks 26 collection simultaneously. The blocking mechanism 28 is notified by the chunking operations 24 master process that transitional sequence chunk output production has started. At least one chunking worker begins producing transitional sequence chunk outputs in parallel as directed by the chunking operations 24 master process. The blocking mechanism 28 exposes the sequence chunks 26 collection to the mapping operations 30 as an enumerable collection which is available for enumeration and consumption. The mapping operations 30 workers will consume the transitional sequence chunk outputs until the blocking mechanism is notified by the chunking operations 24 that sequence chunk production has completed and all transitional sequence chunk outputs have been consumed.

In the event that there are no transitional sequence chunk outputs to consume and chunking operations 24 sequence chunk productions have not completed, the blocking mechanism 28 allows the mapping operations 30 workers to "block" or wait until additional transitional sequence chunk outputs are produced by the chunking operations 24. Memory consumption can also be managed within the blocking mechanism 28 by setting a pre-determined sequence chunks 26 collection capacity. When this capacity is exceeded, the blocking mechanism 28 allows chunking operations 24 sequence chunk production workers to stop production and "block" or wait until additional transitional sequence chunk outputs are removed from the sequence chunks 26 collection by the mapping operations 30 workers and the sequence chunks 26 collection capacity falls back below the pre-determined production capacity threshold.

Mapping Operations

In some embodiments, the system 10 (FIG. 1) includes one or more mapping operations 30 processes, including at least one mapping worker, configured to consume and process transitional sequence chunk outputs in parallel from the chunking operations 24. The sequence chunks 26 collection and blocking mechanism 28 act as an intermediate data structure between chunking operations 24 and mapping operations 30 for storing transitional sequence chunk outputs. The mapping operations 30 include mapping workers which continually consume transitional sequence chunk outputs in parallel from the sequence chunks 26 collection using the blocking mechanism 28 to remove individual transitional sequence chunk outputs in parallel while additional transitional sequence chunk outputs are being simultaneously added into the sequence chunks 26 collection by one or more chunking operations 24. The mapping operations 30 also include a master process controlling the mapping worker threads and interactions between the mapping operations 30 and the blocking mechanism 28. The programs or instructions for handling the parallelization of the mapping operations 30 are preferably application independent and automatically parallelized across multiple processors in the parallel processing environment.

The transitional sequence chunk outputs are consumed by the mapping operations 30 from the sequence chunks 26 collection using the blocking mechanism 28, and then each sequence chunk's text is "mapped" into many additional transitional sequence token outputs each containing mapped keys called gene tokens. The mapped gene token keys contained within each transitional sequence token output represent individual, independent units of intermediate work which are conducive to highly parallel locality sensitive hashing operations 34.

Figure 5:
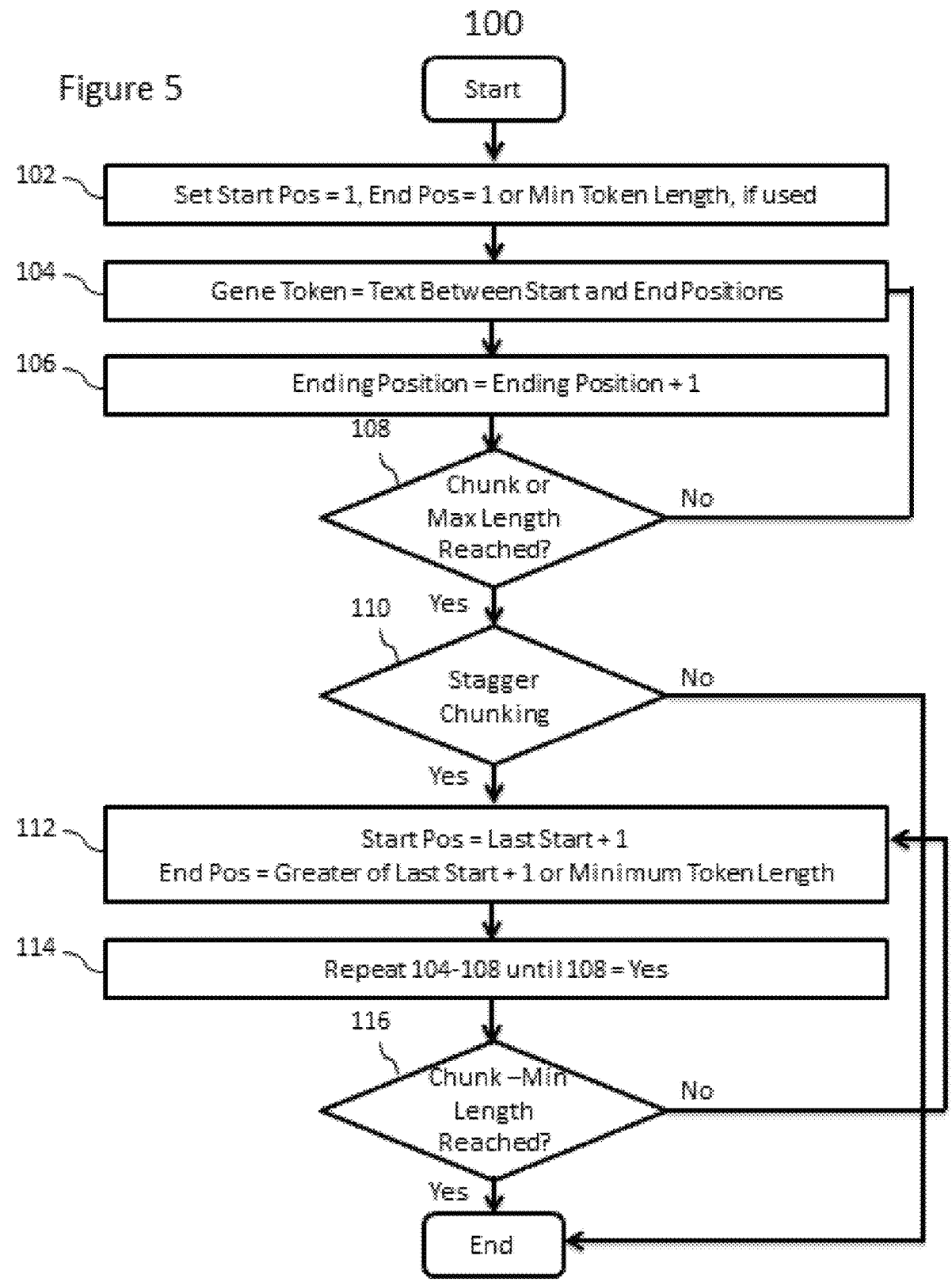
FIG. 5 illustrates a flow diagram of a Sequence Mapping Method in accordance with one embodiment of the present invention.

FIG. 5 illustrates a Sequence Mapping Method 100 for mapping transitional sequence chunk outputs in parallel, converting each sequence chunk's text into multiple transitional sequence token outputs. Each transitional sequence token output contains a gene token and is placed into the sequence tokens 32 collection (FIG. 1) using an instance of the blocking mechanism 28. According to the Sequence Mapping Method 100 embodiment, starting and ending positions are both set to the greater value of either 1 or the minimum token length in step 102. New gene tokens are created in step 104 using the sequence chunk's text occurring between the starting and ending positions defined in step 102 and subsequently modified in step 106. After each new gene token is identified, the ending position is incremented by 1 according to step 106. Steps 102-106 are repeated until step 108 determines that either the maximum token length or the ending position of the gene sequence chunk is reached. Then no more gene tokens are generated for the sequence chunk unless stagger chunking has been deployed as determined by step 110. If stagger chunking has occurred, step 112 resets the starting and ending positions to the last start position+1. Steps 104-108 are then repeated generating additional gene tokens in transitional sequence token outputs until step 108 determines that either the maximum token length or the ending position of the gene sequence chunk is once again reached. Steps 112-116 are continually repeated until the start and end positions equal the sequence chunk's length-min token length, and no more gene tokens are generated for the sequence chunk. Additional sub-sequence mappings are preferred when stagger chunking is deployed since the total numbers of sequence chunks produced are drastically reduced during a stagger chunking process.

Sequence Tokens

FIG. 3 shows Sequence Chunk and Sequence Token Data Structure Embodiments 66 that includes a sequence token 72 embodiment which could be used in the FIG. 1, system 10 sequence tokens 32 collection. The sequence token 70 embodiment includes a sequence ID associating each sequence token with the gene sequence that generated the sequence token. In system 10 (FIG. 1), information regarding the gene sequence can quickly be access during processing from the category manager 12's sequence collection 14. Any categories associated with the sequence token 72 can also be quickly identified using the sequence token's sequence ID. In system 10 (FIG. 1), information regarding the gene sequence's associated categories can be accessed using the category manager 12's default frequencies 18 collection. Sequence token embodiments also include a gene token value in some form. The sequence token 72 embodiment includes a gene token annotation which includes the starting and ending positions of the gene token within the gene sequence's text. Other embodiments could include an annotation made up of the gene token's starting position and length within the gene sequence's text. Yet other embodiments could include a hash of the gene token's text or the actual gene token's text. Certain sequence token embodiments could include an array of categories as shown in the sequence token 68 embodiment. The same data structure or object could be used within the system 10 (FIG. 1) to encapsulate either sequence chunks or sequence tokens. These data structures could include in-memory or serialized objects or structs, files, database tables or records, and/or any other structure suitable for transporting relevant information contained within the sequence chunks or sequence tokens.

Sequence Tokens Collection and Blocking Mechanism

At least one instance of the blocking mechanism 28 is used to manage the potential differences in speed between sequence token production into the sequence tokens 32 collection by the mapping operations 30 and sequence token consumption from the sequence tokens 32 collection by the locality sensitive hashing operations 34, herein referred to as LSH operations 34. According to system 10 (FIG. 1), the sequence tokens 32 collection is implemented using a thread-safe bag approach. This embodiment favors sequence token processing speed over any particular insertion or removal processing/queuing order. Many mapping operations 30 worker threads can add sequence token items to the sequence tokens 32 collection while many LSH operations 34 workers are concurrently removing items from the sequence tokens 32 collection simultaneously. The blocking mechanism 28 is notified by the mapping operations 30 master process that transitional sequence tokens output production has started. At least one token worker begins producing transitional sequence token outputs in parallel as directed by the mapping operations 30 master process. The blocking mechanism 28 exposes the sequence tokens 32 collection to the LSH operations 34 as an enumerable collection which is available for enumeration and consumption. The LSH operations 34 workers will consume the transitional sequence token outputs until the blocking mechanism 28 is notified by the mapping operations 30 that sequence token production has completed and all transitional sequence token outputs have been consumed.

In the event that there are no transitional sequence token outputs to consume and mapping operations 30 sequence token productions have not completed, the blocking mechanism 28 allows the LSH operations 34 workers to "block" or wait until additional transitional sequence token outputs are produced by the mapping operations 30. Memory consumption can also be managed within the blocking mechanism 28 by setting a pre-determined sequence tokens 32 collection capacity. When this capacity is exceeded, the blocking mechanism 28 allows mapping operations 30 sequence token production workers to stop production and "block" or wait until additional transitional sequence token outputs are removed from the sequence tokens 32 collection by the LSH operations 34 workers and the sequence tokens 32 collection capacity falls back below the pre-determined production capacity threshold.

Locality Sensitive Hashing

FIG. 2 illustrates a block diagram of a Locality Sensitive Hashing Operations MinHash System 50. In some embodiments, Locality Sensitive Hashing operations are used to drastically reduce the amount of data storage capacity required to learn and classify gene sequence data. The system 10 (FIG. 1) includes at least one Locality Sensitive Hashing Operations MinHash System 50 within the LSH operations 34 module. The MinHash System 50 includes a MinHash Initialization stage 54 which includes a MinHash delegates collection 58 and a universe size 56. The universe size 56 is pre-determined and specified when an instance of the MinHash System 50 is created. The universe size 56 is set one time during the MinHash Initialization stage 54. The MinHash delegates collection 58 contains a collection of unique hash functions which are also created during the MinHash Initialization stage 54. Each unique hash function uses the universe size 56 as a maximum value for all random numbers generated during hash function creation and should represent the estimated maximum number of items to be processed or "MinHashed" by the MinHash System 50.

Hash functions could be created using many different approaches. The following example is merely exemplary and any suitable approach for producing unique hash functions could be used. A typical MinHash system 50 embodiment generates any number of unique hash functions by first selecting three random, non-negative numbers x, y, z for each unique hash function. A distinct hash function can then be created by using the three random numbers in a hash formula similar to the following: hashValue=(int)((x*(i>>4)+y*i+z) & 131071), where i represents the input value to be hashed. Each unique hash function definition is then saved as a hash function delegate within the MinHash delegates collection 58. Each of the unique hash functions will also contain various preferably unique random numbers generated for the variables x,y,z.

Some MinHash System 50 embodiments also include a MinHash Producer 52 which utilizes the MinHash delegates collection 58, SkipDups Set 60, and a collection of MinHash Sets 62 to produce any number of MinHash Sets in parallel. For example, a single MinHash set could be produced by using a pre-determined number of distinct hash functions which are created and stored within the MinHash delegates collection 58 during MinHash Initialization stage 54. Each MinHash delegate is used to repeatedly hash any number of unique keys one time each. As the unique keys are repeatedly hashed, only one minimum resulting hash value for each of the distinct hash functions are retained across all keys in one MinHashSet Item 64 contained within the MinHash Sets Collection 62. When the process is completed the MinHashSet Item 64 contains only one minimum hash value for each of the distinct hash functions in a MinHash value array of minimum hash values which represent the unique characteristics of all the keys processed. The MinHashSet Item 64 also contains the sequence ID from which all gene token keys were produced.

Each time a key is processed, the SkipDups Set 60 is used to determine if the key has been previously encountered. In one embodiment, the previously encountered keys can be skipped to avoid the repeated hashing across all the hash functions contained within the MinHash delegates collection 58 more than one time per unique key and per gene sequence. In other embodiments, only a portion of unique keys could be hashed into bands to identify candidate matches for which further MinHashing could be completed later on to improve performance when a very large number of keys exist. Classification metric functions could be performed against bands from separate MinHash Item sets to identify the candidate matches in a pre-processing MinHash stage for which further MinHash processing could then be completed.

The MinHash Sets Collection 62 (FIG. 2) is shown in system 10 (FIG. 1) as LSH MinHash Set Collection 36. In system 10 (FIG. 1), mapping operations 30 are continually producing transitional sequence token outputs in parallel and placing them into the sequence tokens collection 32 using an instance of the blocking mechanism 28. Simultaneously, LSH operations 34 are using the blocking mechanism 28 to consume the transitional sequence token outputs in parallel from the sequence tokens collection 32 and perform MinHashing on each unique gene token value encountered within the MinHash Producer 52. The MinHash Producer 52 tracks unique gene tokens using the SkipDups Set 60, only allowing unique gene tokens to be processed by all hash functions contained within the MinHash delegates collection 58. The sequence ID within each sequence token processed is used to identify the correct MinHashSet Item 64 within the MinHash Sets Collection 62 allowing any number of unique gene sequences to be processed by the LSH operations 34 in parallel. Each MinHashSet Item 64 is stored as a key value pair using the sequence ID as its key and a MinHash value array as its value. Since the lengths of the original gene token's text are lost when hashing occurs, each MinHashSet Item 64 could also contain a MinHash length array that includes the lengths for each gene token that resulted in a minimum hash value as part of the key value pair's value. In certain embodiments, the length array could be used later in classification metric function 42 processing as shown in system 10 (FIG. 1).

MinHash Set Key Value Pair Collection

The LSH MinHash Set Collection 36 acts as a keyed transitional output collection containing all the distinct MinHash sets being processed during any LSH operations 34. Since LSH operations 34 could be performed on many unique gene sequences in parallel, the LSH MinHash Set Collection 36 is keyed by each gene sequence's sequence ID. The LSH MinHash Set Collection 36 could be a Dictionary data structure or collection of key value pairs using the sequence ID as its key and any data relevant to LSH operations 34 as its value. In other embodiments this information could be contained in a database table, file system, hash based file system, or any other structure which would allow rapid access using a unique sequence ID. Data relevant to LSH operations 34 could include the MinHash value array, MinHash length array, or any other information used to perform subsequent classification metric functions 42 or reduction operations 38. As each MinHashSet Item 64 is completed, the entire item can be provided as input to classification metric function 42 for classification processing and/or reduction operations 38 for consolidation into the nested categorical key value pair collection 40.

Figure 6:
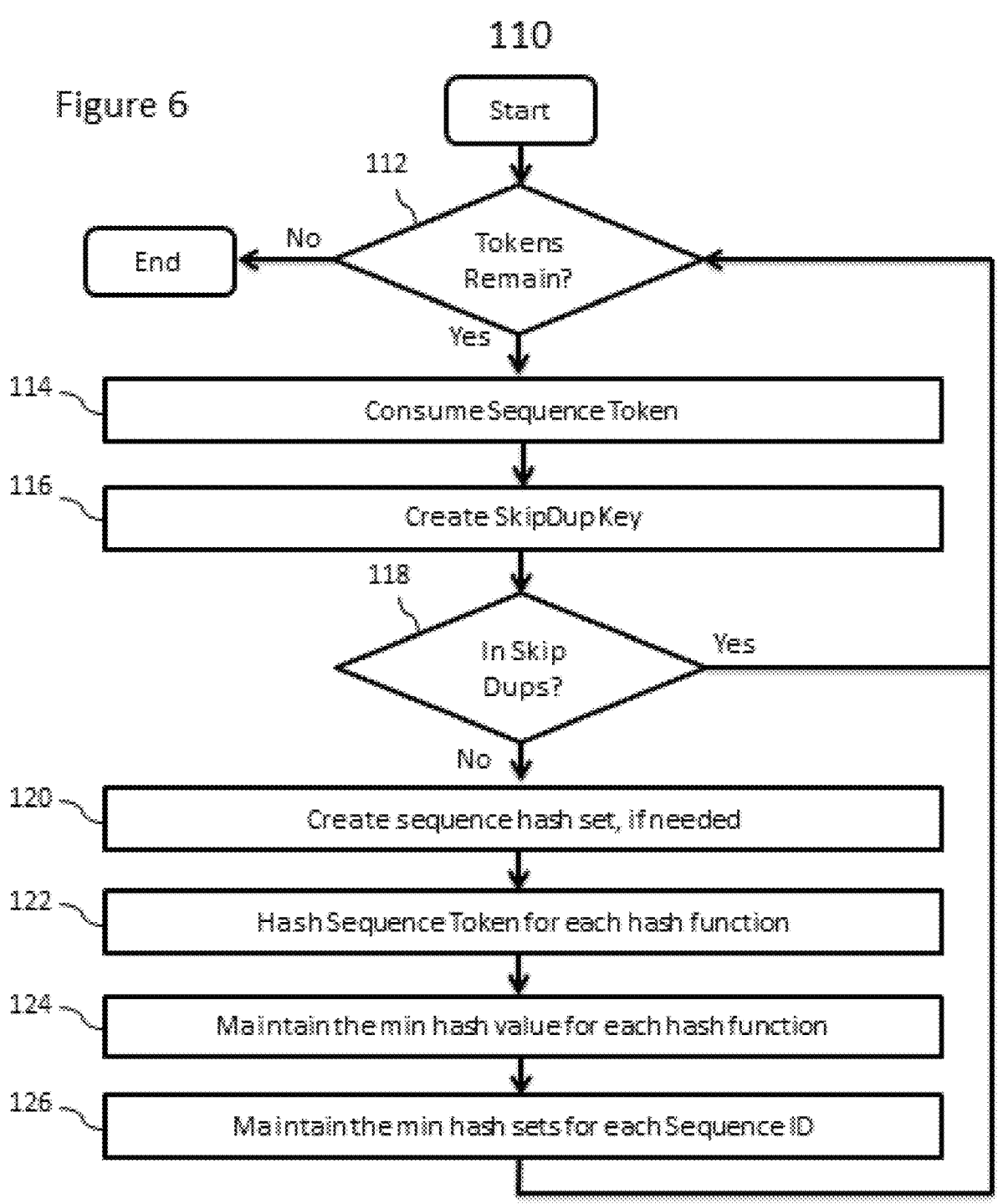
FIG. 6 illustrates a flow diagram of a Gene Token Locality Sensitive Hashing Method in accordance with another embodiment of the present invention.

FIG. 6 illustrates a flow diagram of a Gene Token Locality Sensitive Hashing Method 120 for performing MinHashing within system 10 (FIG. 1), LSH operations 34 on any number of sequence tokens associated with an individual gene sequence. Steps 122-128 are continually repeated until all sequence tokens have been processed. First, an individual sequence token is received as input during Step 124. A unique SkipDup key is then created in Step 126 by combining the sequence token's sequence ID and gene token text. In some embodiments the two values could be concatenated together into one string key value. Other embodiments might hash a combination of the two values to produce a unique key. Step 128 attempts to add the SkipDup key to a hashset or other similar data structure requiring that the SkipDup key is unique. If the SkipDup key addition fails, the duplicate gene token value is discarded. However, if the SkipDup key is successfully added, the gene token's sequence ID is checked within the MinHash Set Collection 62 to determine if a MinHash Set already exists for the sequence token's sequence ID. The MinHash Set Item 64 is then created, if it does not exist. In Step 132, the gene token is repeatedly hashed one time for each unique hash function existing in the MinHash delegates 58 collection. Each hash value produced is referenced within the correct MinHash Set item 64's MinHash values collection to determine if a minimum value has been produced for the specific hash function in question. Step 134 retains the minimum hash values produced by each gene token for each unique hash function in the correct MinHash Set Item 64 within the MinHash sets collection 62. Step 136 uses each gene token's sequence ID to ensure that each minimum hash value is identified and retained within the correct MinHash Set Item 64 within the MinHash Set Collection 62. The sequence ID ties each MinHash Set Item 64 to the gene sequence producing the gene tokens which generated the minimum hash values contained within the set.

Reduction Operations

According to one invention embodiment, system 10 (FIG. 1), uses one or more reduction operations 38 to continually and simultaneously aggregate or reduce the MinHash Set Items 64 (FIG. 2) by eliminating the matching minimum hash value keys and aggregating values consistent with the specified reduction operations 38 for all matching minimum hash value keys which are encountered during reduction operations 38 processing. The LSH MinHash Set Collection 36 acts as an intermediate data structure between LSH operations 34 and reduction operations 38 for storing transitional MinHash Set Item 64 (FIG. 2) outputs. The reduction operations 38 process also includes at least one master thread controlling the reduction worker threads and interactions between the reduction operations 38 and the LSH MinHash Set Collection 36. The reduction operations 38 reduction workers consume completed transitional MinHash Set Items 64 (FIG. 2) outputs in parallel from the LSH MinHash Set Collection 36 as directed by the reduction master thread. The programs or instructions for handling the parallelization of the reduction operations 38 are preferably application independent and automatically parallelized across multiple processors in the parallel processing environment.

In some embodiments, the reduction operations 38 worker threads are used to consolidate or further reduce MinHash Set Item outputs by storing all outputs using similar map reduction aggregation methods 22 in a collection of nested key value pairs where the key for each key-value pair maps to a second or nested collection of "categorical" key-value pairs as its value. As shown in FIG. 1, the nested categorical key value pair collection 40 could also be partitioned using each distinct hash function within the LSH operations 34 and the Minhash delegates collection 58 (FIG. 2) as its partitioning value. The partitioning method used ensures that matching minimum hash values produced by different hashing functions within locality sensitive hashing operations 34 are aggregated as separate values specific to each unique hash function producing the value. Using this technique, each time the map reduction aggregation 22 process produces additional MinHash set items 64 (FIG. 2), they can be consolidated into the nested categorical key value pair collection 40 when needed. For example, each time a new gene sequence is processed for learning, a MinHash set item 64 is added to the LSH MinHash Set Collection 36. The reduction operations 38 master thread assigns the MinHash set item 64 to the reduction workers which process the MinHash set item 64 MinHash values in parallel. Each minimum hash value contained within the MinHash set item 64's MinHash values array are consolidated within the nested categorical key value pair collection 40's keys using the correct partition for the unique hash function which produced the MinHash value.

Nested Categorical Key Value Pair Collection

In certain embodiments, a nested categorical key value pair collection 40 is used to further consolidate MinHash set items 64 when similar map reduction aggregation 22 methods are used. Embodiments deploying LSH operations 34, may further partition the nested categorical key value pair collection 40 to distinguish between keys produced by each unique hash function used within LSH operations 34 and the MinHash delegates 58 (FIG. 2) collection. The nested categorical key value pair collection 40 partitions could be created simply by maintaining an array of nested categorical key value pair collection 40s containing one array member for each unique hash function partition. Other embodiments could use a database, in-memory database, or other suitable data structures such as a nested key value pair arrangement to implement the collection and partitions. It is preferred that all data required for processing within the nested categorical key value pair collection 40 be available within in main memory as disk I/O destroys processing speed for the entire system 10 (FIG. 1). When a matching minimum hash key value from the MinHash set item 64's MinHash values array exists within the nested categorical key value pair collection 40's keys, the nested categorical key value pair collection is obtained from the value of the nested categorical key value pair collection 40's matching key. In addition, the MinHash set item 64's sequence ID is used to quickly access the associated gene sequence's associated categories from the category manager 12's default frequencies 18 collection. Each associated category ID is referenced within the matching key's nested categorical key value pair collection value. MinHash values are then consolidated within the correct partition by incrementing the matching category ID value by 1 when only keys are used. However, when values are also used, the category ID value is typically incremented by a number equal to the value amount for the matching category contained within the MinHash Set item 64's value collection. The MinHash Set item 64's value collection could be a simple array containing only minimum hash values, or the collection could contain more complex structures such as Dictionaries of key value pairs containing minimum hash values as keys and associated frequencies as values. Yet in other embodiments, the value could contain multiple measures relevant to the data and categories contained within the nested categorical key value pair collection 40. The relevant information would typically be used during specialized distance or similarity calculations with the classification metric function 42. For example, in system 10 (FIG. 1), the MinHash Set item 64 contains both minimum hash values and minimum hash value lengths which are used during the classification metric function 42's Length Weighted Frequency calculations which were previously described.

Classification Metric Function Operations

Particular embodiments use at least one classification metric function 42 as illustrated in FIG. 1 (system 10). The classification metric function 42 receives one or more Min- Hash Set items 64 as input and can utilize the nested categorical key value pair collection 40 to calculate similarities or distances between MinHash Set items 64 and/or known categories within the nested categorical key value pair collection 40. Categories can be any alpha and/or numeric category descriptions within the category manager 12's category collection 16. Each unique category typically associates at least one category ID with at least one sequence ID. The classification metric functions 42 include at least one classification totals 46 for managing category frequency totals during distance and or similarity calculations, and at least one penetration totals 48 collection which contain similarity or distance score values for at least one known category or MinHash Set item 64. In some embodiments, the system 10 would typically calculate one distance and or similarity metric in penetration totals 48 collection for each classification total contained within classification totals 46 collection.

According to the FIG. 1 embodiment, when input data is provided to the system 10, a similar classification map reduction aggregation 22 process is performed for the purposes of either learning and/or classification. Map reduction aggregation 22 uses a highly parallel process to consume the input data producing individual MinHash Set items 64 for each unique gene sequence provided to the system 10. During learning, the map reduction aggregation 22 MinHash Set items 64 are provided to the reduction operations 38 for consolidation into the categorical key value pair collection 40. Once the consolidation step in reduction operations 38 is completed, the input data provided is considered to be "learned" and "known" by the system 10. Any new categories now reside within the category manager 12's category collection 16, all new gene sequences have been given a gene sequence ID and become "known" within the system, all gene sequence ID category associations and default frequencies are saved within the category manager 12's default frequencies 18 collection, and all gene sequence tokens are reduced into MinHash Set items 64 which contain minimum hash values representing the unique characteristics of each provided gene sequence. Learning processes have also provided the map reduction aggregation 22 MinHash Set items 64 transitional outputs to reduction operations 38 where all minimum hash values have been consolidated into the correct nested categorical key value pair collection 40. The nested categorical key value pair collection 40 now contains all unique minimum hash values produced during LSH operations 34. The unique minimum hash values are partitioned by each unique hash function producing the minimum hash values within the nested categorical key value pair collection 40. Each unique hash function's minimum hash values have also been associated with at least one valid nested key value pair containing a category ID and value which usually contains the frequency at which a particular minimum hash value associated with a particular category ID value was encountered during learning. The value could also contain other relevant data elements used during classification metric function 42 operations. Embodiments not deploying LSH operations 34 could use unique gene token values produced during mapping operations 30 as keys within the nested categorical key value pair collection 40. In this type of embodiment, no hash function partitions are required since multiple hashing functions are not used, and each sequence token from the sequence tokens 32 collection are consolidated directly into the nested categorical key value pair collection 40 by reduction operations 38. However, it is preferable to deploy LSH operations 34 since these operations drastically reduce the volume of data required for storage within the nested categorical key value pair collection 40 and increases classification performance.

During classification, input data of known or unknown origin is provided to the system 10. Input data could be both classified and/or learned during the same process in certain embodiments of the invention. Particular embodiments could also have multiple map reduction aggregation 22 methods. However, it is preferred that classification against categories contained within a nested categorical key value pair collection 40 or another MinHash set item 64 be performed using the same map reduction aggregation 22 method. When multiple map reduction aggregation 22 methods are deployed, it is preferable that outputs resulting from each unique map reduction aggregation 22 method be separated into different nested categorical key value pair collections 40 or clearly be separated within a single collection using partitions or another acceptable method. Classification processes direct the map reduction aggregation 22 MinHash Set items 64 transitional outputs to the classification metric function 42. The classification metric function 42 takes each minimum hash value contained within each MinHash Set items 64 and references the minimum hash value within the correct nested categorical key value pair collection 40 partition. The nested categorical key value pair collection 40's value contains a collection of all category IDs and any frequency and/or other information required for specific embodiments of the classification metric function 42's calculations.

In certain embodiments, the classification totals 46 collection contains one category ID key value pair entry for each category ID contained within the category manager 12's category collection 16. However, other embodiments only perform classification totals 46 on category IDs requested by the user or another process requesting the classification. Yet in other embodiments, category associations could be used to perform tiered category ID classifications based on the classification results from a smaller initial set of category IDs on which classification is performed. For example, a gene sequence could be classified against 5 kingdom level taxonomy categories. Once the initial classification identifies the gene sequence as belonging to the bacteria kingdom, additional classifications could be performed using only additional categories which are associated with the bacteria kingdom.

As classification metric function 42 processes proceed, each input key provided is referenced within the nested categorical key value pair collection 40. Input keys provided could consist of minimum hash values contained with a MinHash Set item 64, a gene token contained within a sequence token, or any other final output key being consolidated into the categorical key value pair collection 40. When a referenced key exists within the nested categorical key value pair collection 40, the key's value containing the nested categorical collection is accessed and the classification totals 46 collection is updated for each matching category ID and value of interest within the nested categorical collection. In certain embodiments, this simply means incrementing each matching category ID within the classification totals 46 collection by a value equal to the value contained within the matching category entry from the nested categorical collection.

Other classification metric function 42 embodiments using similarity functions such as the Simple Length Weighted Frequency Jaccard ( ) may use additional elements including the length of each gene token producing a minimum hash to weight the values added into the classification totals 46 collection. In such embodiments, the MinHash set item 64 contains a MinHash length array which includes the lengths for each gene token's text which produced a minimum hash value. When a referenced key exists within the nested categorical key value pair collection 40, the key's value containing the nested categorical collection is accessed and the classification totals 46 collection is updated for each matching category ID and value of interest within the nested categorical collection by multiplying the value contained within the matching category entry from the nested categorical collection by the appropriate length value from the MinHash length array. The weighted amount is then added to the appropriate category ID entry within the classification totals 46 collection. When all minimum hash values have been processed, the classification totals 46 collection contains a value for each relevant category ID representing the sum of all matching key's length weighted frequencies. Each value in the classification totals 46 collection is then divided by the matching category ID entry within the category manager 12's category totals 20 collection, and the resulting values are placed into the penetration totals 48 collection. In some alternative embodiments, the values within the classification totals 46 collection could be updated in place to produce the final result, and no penetration totals 48 collection would be required.

Figure 7:
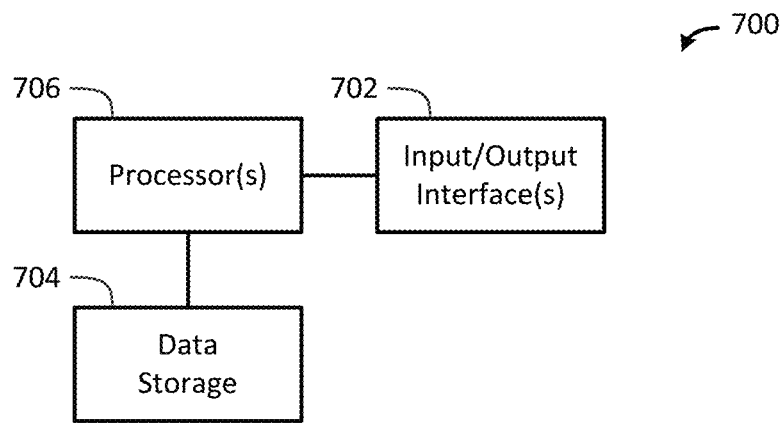
FIG. 7 illustrates a block diagram of a system in accordance with another embodiment of the present invention.

FIG. 7 illustrates a block diagram of a system 700 in accordance with another embodiment of the present invention. A system 700 for classifying data includes at least one input/output interface 702, a data storage 704, and one or more processors 706 communicably coupled to the at least on input/output interface 702 and the data storage 704. The one or more processors 706 perform the steps of (a) receiving the data from the at least one input/output interface, (b) dividing the received data into two or more chunks, (c) mapping each chunk into a token and storing the token in a token collection within the data storage, (d) hashing each token using two or more local sensitivity hashing functions, wherein each local sensitivity hashing function contains two or more random hashing seed numbers, determining a minimum hash value for each local sensitivity hashing function, and storing the minimum hash value for each local sensitivity hashing function in a minimum hash set collection within the data storage, and (e) classifying the data using the minimum hash values for the tokens. The one or more processors 706 may perform other steps as described herein.

Figure 8:
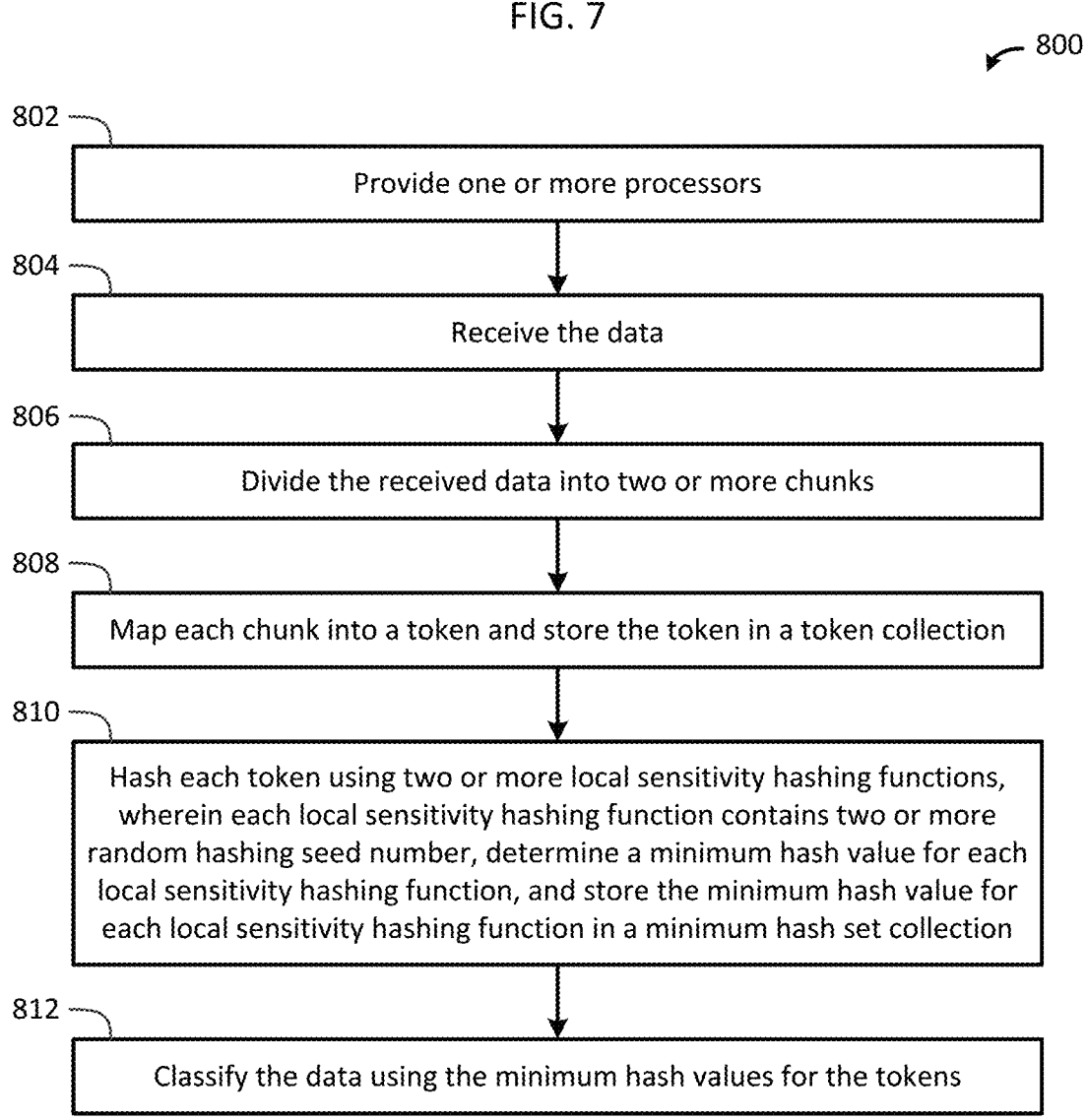
FIG. 8 illustrates a flow diagram of a method for classifying data in accordance with another embodiment of the present invention.

FIG. 8 illustrates a flow diagram of a computerized method 800 for classifying data in accordance with another embodiment of the present invention. One or more processors are provided in block 802 that perform the steps of the method. The data is received in block 804 and the received data is divided into two or more chunks in block 806. Each chunk is mapped into a token and the token is stored in a token collection in block 808. Each token is hashed in block 810 using two or more local sensitivity hashing functions, wherein each local sensitivity hashing function contains two or more random hashing seed numbers. A minimum hash value for each local sensitivity hashing function is determined, and the minimum hash value for each local sensitivity hashing function is stored in a minimum hash set collection. The data is classified using the minimum hash values for the tokens in block 812. The foregoing steps are performed by one or more processors. Note that the method can be implemented as a computer program embodied on a non-transitory computer readable storage medium that is executed using one or more processors for classifying data wherein each step is made up of one or more code segments. Moreover, the foregoing steps can be used to construct a learning machine.

The two or more chunks may overlap one another by a stagger offset. The data can be received by extracting the data from one or more data sources. The data may include one or more categories associated with the data. The data may also include an unstructured gene sequence data (e.g., one or more categories, a gene sequence full name, a fasta identification number, a kingdom, a phylum, a class, an order, a family genus, a species or a combination thereof). Additional steps may include: (1) validating the data; (2) receiving an input data comprising two or more sets of data, separating the two or more sets of data from one another, and determining whether to classify the two or more sets of data sequentially, parallel or a combination thereof; (3) assigning a unique identifier to the data; and/or (4) maintaining a collection of the data, a collection of one or more categories associated with the data, a collection of totals of the categories, and a collection of category default frequencies.

Super Threaded Reference-Free Alignment-Free N-Sequence Decoder (STRAND)

An example of one embodiment of the present invention will now be described. More specifically, the Super Threaded Reference-Free Alignment-Free N-sequence Decoder (STRAND) is a highly parallel system and method for the learning and classification of gene sequence data into any number of associated categories or gene sequence taxonomies using variable length k-mer words, MapReduce style processing, and locality sensitive hashing. Previous gene sequence classification algorithms, including RDP, have balanced accuracy and performance by limiting k-mer word lengths using a pre-defined level of acceptable substitutions.

STRAND is an embodiment of a novel process for the rapid and highly parallel learning and classification of gene sequence data. During classification, the relationship between a form of locality sensitive hashing called minhashing and Jaccard similarity is exploited to identify and retain only an extremely small set of targeted gene sequence data. In this example, variable k-mer word lengths of 75 and 200 bases were utilized to more accurately distinguish between taxonomy categories by increasing the feature space available for use during minhashing. This allows the system to learn gene sequences taxonomies and rapidly classify against such data approximately 10 times faster than the "gold standard" RDP classifier while still achieving comparable accuracy results.

Furthermore, STRAND uses Google's protocol buffers to serialize its training models to disk. This approach offers optimal disk space consumption when compared to RDP. Empirical results show STRAND reducing disk space consumption for training data at an average of 5 percent during ten-fold cross-validation.

Research related to efficient algorithms and software tools for the identification of similarities and differences between gene sequences dates back as far as 1970 when various forms of dynamic programming were used to determine the insertions, deletions, and replacements between candidate sequences for calculation of a least costly alignment comparison score [1]. This particular distance metric, commonly referred to as Levenshtein or edit distance, was predominately utilized for such scores until the basic local alignment search tool (BLAST) [1] introduced efficient searching of DNA sequence data using statistically significant word lists around 1990.

Gene sequence word k-mers (also known as shingles, w-mers, d-mers, x-mers, n-tuples, q-grams, n-grams, or words) are extracted from individual gene sequences and used for similarity and distance estimations between two or more gene sequences [19]. Numerous methods for the extraction, retention, and matching of k-mer collections from sequence data have been studied. Some of these methods include: 12-mer collections with the compression of 4 nucleotides per byte using byte-wise searching [1], sorting of k-mer collections for the optimized processing of shorter matches within similar sequences [11], modification of the edit distance calculation to include only removals (maximal matches) in order to perform distance calculations in linear time [18], and the use of locality sensitive hashing to match similar k-mers [5].

This example combines the following three primary contributions in a novel and innovative way to achieve the results presented:

1) Jaccard similarity is used as an approximation for edit distance when determining the similarities and differences between gene sequence data.
2) A form of Locality Sensitive Hashing (LSH) called minhashing is used to rapidly sample longer word lengths for enhanced accuracy. This allows us to estimate Jaccard similarity without computing and storing counts for all possible words, but use the intersection of minimum hash signatures produced during the minhashing process. We also demonstrate that this highly efficient similarity measure is identical in accuracy to other less efficient calculations such as tf–idf (term frequency–inverse document frequency).
3) A MapReduce style parallel pipeline is used to simultaneously identify unique gene sequence words, minhash words generating minhash signatures, and intersect minhash signatures to estimate Jaccard similarity for highly accurate and efficient identification of gene sequence taxonomies.

In this example, a form of locality sensitive hashing called minhashing is used to rapidly identify common variable length words extracted from individual gene sequence data. The words extracted range in lengths between a pre-defined minimum and maximum word length, or several individual selected word lengths across a much wider word length range can be used. While longer word lengths have proven to enhance both specificity and efficiency, maintaining sensitivity to weak similarities was problematic, since only a single word length was used. Buhler [5] addressed this problem with a randomized algorithm that uses LSH to allow for inexact matches between longer words of a single predefined length. Note that the method presented herein also uses LSH, but in a very different way. It is used to enhance exact word matching when the number of possible words becomes to large to store. For example the number of unique words of length 100 is already more than $10^{60}$ distinct words.

The RDP classifier utilizes a fixed word length of only 8 bases to perform its taxonomy classification processing making the total possible number of unique words (i.e. features for the classifier) only $4^8$=65; 536 words [20]. In addition to sampling, 100 bootstrap trials must be performed in order to minimize randomization errors during each classification [20]. By using longer words and a much larger feature space, STRAND is able to successfully differentiate between large volumes trained sequence data using only a single comparison trail during its classification stage.

STRAND utilizes random sampling and an exact-match-based comparison strategy using long words while still accounting for weak similarities by incorporating variable word lengths. By using the much larger possible feature space provided by longer word lengths combined with locality sensitive hashing to reduce memory requirements, classification accuracy similar to RDP can still be achieved at much shorter classification processing times and without the need for multiple execution iterations to minimize randomization errors. All stages of STRAND processing are highly parallelized, concurrently mapping all identified words from a targeted gene sequence and reducing mapped words into matches simultaneously. The unique relationship between Jaccard distance and locality sensitive hashing also allows minhashing to occur during learning storing only a pre-determined number of minimum hash values in place of all words extracted from the targeted gene sequence. This process drastically reduces the amount of memory during learning and classification that would typically be required when using longer word lengths. The similarity between two sequences using minimum hash values can be predicted with great accuracy since, the probability that the minhash function for a random permutation of gene sequence words produces the same value between two sets of gene sequence words equals the Jaccard similarity of those two sets [16].

This example combines the three general concepts word extraction, minhashing, and multicore MapReduce style processing in a novel way that produces superior gene sequence classification results. The following sections briefly describe background material relevant to this research.

a. Word Identification and Counting

The general concept of k-mers or words was originally defined as (n-grams) during 1948 in an information theoretic context [17]. The term word is used in this example to refer to n-grams created from a gene sequence. Over the past twenty years, numerous methods utilizing words for gene sequence comparison and classification have been presented [19]. These methods are typically much faster than alignment-based methods and are often called alignment-free methods. The most common method for word extraction generally uses a sliding window for which the gene sequence word length is pre-determined. Once the word length k is defined, the sliding window moves from left to right across the gene sequence data producing each word by capturing k consecutive bases from the sequence.

Although many sequence comparison tools allow the user to change the value for k prior to word extraction, no gene sequence comparison tools were identified which produced or counted variable length words during the extraction process. STRAND is similar to highly parallel word counting tools such as Jellyfish [14] using a lock-free hash table implementation to identify unique gene sequence words storing category associations and word frequencies when required. STRAND extends typical word counting application functionality by supporting the identification and counting of variable length gene sequence words during a single execution. Furthermore, STRAND executes parallel pipeline processing stages for word identification and counting simultaneously exchanging pointers to results using intermediary thread-safe and lock-free data collections when possible.

B. Minhashing

A form of locality sensitive hashing (LSH) called minhashing uses a family of random hash functions to generate minhash signatures for sampled sets of elements (in this case words in a sequence). Each hash function used in the family of n hash functions implement a unique permutation function, imposing an order on the set to be minhashed. Choosing the first element (i.e., the element with the minimal hash value) from each of the n permutations of the set results in a signature of n elements. Typically the original set is several magnitudes larger than n resulting in a significant reduction of the memory required for storage. From these signatures an accurate estimate of Jaccard similarity can be calculated [2], [16]. Minhashing has been successfully applied in numerous applications including estimating similarity between images [3] and documents [2], document clustering on the Internet [4], image retrieval [8], detecting video copies [6], and relevant news recommendations [13].

C. MapReduce Style Processing

MapReduce style programs break algorithms down into map and reduce steps which represent independent units of work which can be executed using parallel processing. [10] Initially, input data is broken into many pieces and provided to multiple instances of the mapping functions executing in parallel. The result of mapping is typically a key-value pair including an aggregation key and its associated value or values. The key-value pairs are redistributed using the aggregation key and then processed in parallel by multiple instances of the reduce function.

Figure 9:
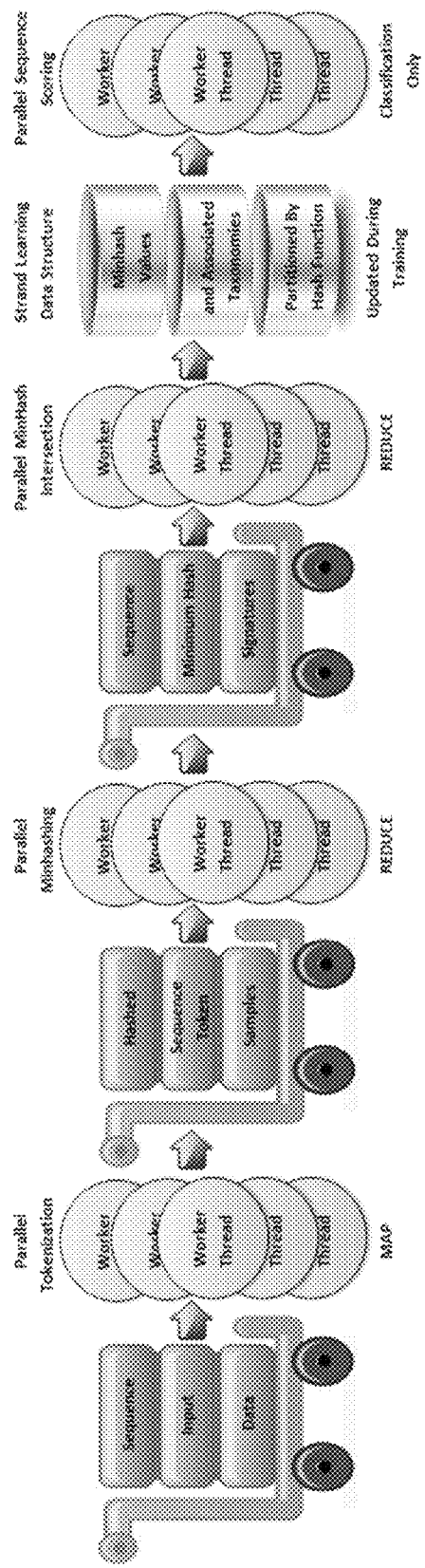
FIG. 9 is a high-level diagram of the STRAND MapReduce Style Pipeline in accordance with another embodiment of the present invention.

MapReduce is highly scalable and has been used by large companies such as Google and Yahoo! to successfully manage rapid growth and extremely massive data processing tasks. [15] Over the past few years, MapReduce processing has been proposed for use in many areas including: analyzing gene sequencing data [15], machine learning on multiple cores [12], and highly fault tolerant data processing systems [7], [9]. FIG. 9 illustrates a high-level diagram of the STRAND MapReduce pipeline including both the mapping of gene sequence data into words, and the reduction of words into minimum hash values which are associated with taxonomy categories and frequencies (when utilized).

III. LEARNING CATEGORY SIGNATURES

Definition 1: Sequence—Any sample of gene sequence bases used as input provided to STRAND for either learning or classification processing.

Definition 2: Minhash—The minimum hash value produced by a single hashing function after hashing all the words generated for a single sequence.

Definition 3: Minhash Signature—The set of all Minhash values produced by all unique hashing functions after hashing all the words generated for a single sequence.

Definition 4: Categories—Within STRAND, all taxonomy levels associated with a single gene sequence are treated as categories. Complete taxonomy hierarchy predictions can be made using only the genus, or the entire taxonomy hierarchy can be trained against as individual categories to produce slightly higher accuracy predictions at the expense of classification performance.

A. Mapping Sequences into Minhash Signatures

A multi-stage parallel mapping pipeline is used to generate all variable length gene sequence words. Using a simple sliding window strategy, intermediate "chunks" of gene sequence bases are created that can easily be further tokenized in parallel. For instance, all words starting at position 1 are generated from within one chunk, while another parallel worker thread is generating all words starting from position 2 in a separate chunk, and yet another worker thread is also creating all words which start from position 3, et. al. Gene sequence words are created from each chunk in parallel by first determining how many word starting positions exist within a chunk, and then randomly selecting a percentage of these starting positions which is equal to the random sample size selected by the user. The process of chunking increases accuracy by ensuring that randomly sampled words are well distributed across all available starting positions within each sequence. When the process of chunking is excluded from word tokenization, both accuracy and performance decrease.

While very long word lengths can increase classification accuracy and feature space size, random sampling must also be used in order to maintain a reasonable word count for subsequent minhash processing performance. The random sample size for word selection can be adjusted to alter both processing time and classification accuracy. All bases within each word selected are also hashed one time prior to minhash processing which reduces the overall memory footprint required for each individual word. From this point forward, no actual sequence input text is used during processing. Duplicate words are also excluded from further processing to eliminate any unnecessary and computationally expensive minhash operations. A pointer to each hashed word and all relevant sequence level data is placed in a transitional thread-safe sequence token collection that is immediately accessible to all minhashing worker threads. It is important to mention that only one copy of the required sequence level data is retained in memory during processing. As each word is being produced, minhashing operations are also performed simultaneously in parallel.

Figure 10:
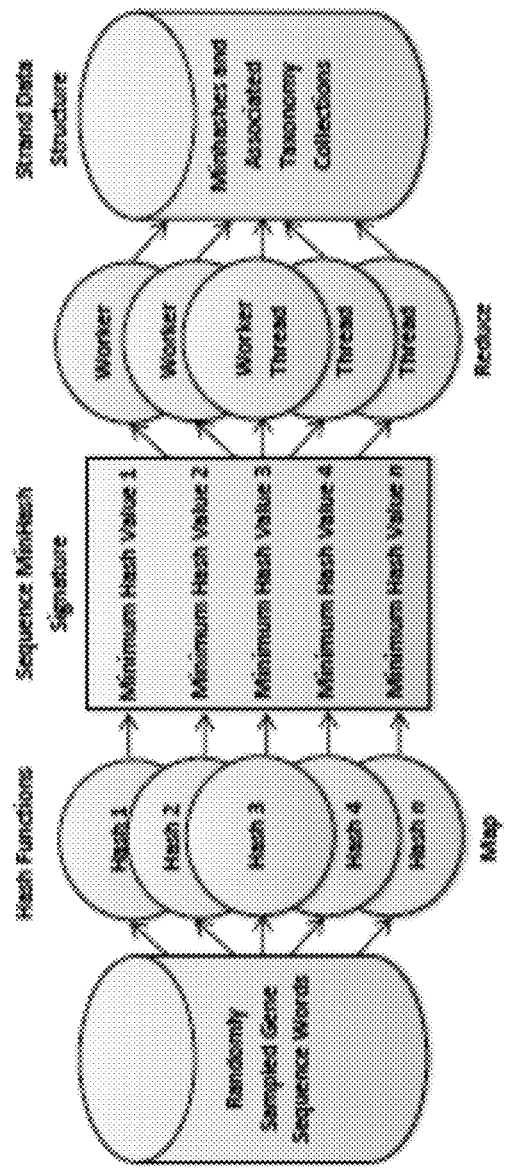
FIG. 10 is a high-level diagram of the STRAND Mapping Words and Reducing Minhash Signatures in accordance with another embodiment of the present invention.

During minhashing, a family of random hashing functions is used to hash all words within a gene sequence one time, and the minimum value produced by each unique hashing function is retained to create a gene sequence's minhash signature. Next, each minhash value within the minhash signature is then reduced by creating taxonomy category associations (during training) or intersecting taxonomy category minhash values (during classification) using the STRAND data structure. FIG. 10 shows STRAND mapping gene sequence words into the minhash signature while simultaneous reduction operations reduce all minhash signature values using the STRAND data structure. Both mapping and reduction operations also occur in parallel.

Min-wise locality sensitive hashing operations are performed in parallel and continually consume all randomly selected word hashes for each processed sequence. Minhash signature length is predetermined by the number of random hashing functions used during minhash processing. In some cases, the total number of hashing functions and overall hashing operations can be reduced by saving the n smallest hash values generated from each individual hashing function. For instance, the number of hashing operations could be cut in half by retaining the 2 smallest values produced from each unique hashing function. However, the number of hashing functions used will impact processing time and overall classification accuracy. Processes using more hashing functions (i.e. longer minhash signatures) have been proven to produce more accurate Jaccard estimations [16]. However, careful consideration must be given to the trade-off between the minhash signature's impact on performance and Jaccard estimation accuracy.

A thread-safe minhash signature collection contains one minhash signature for each unique input sequence. During minhash processing, all hash values produced for each sequence's unique random sample of word hashes are compared to the sequence's current minhash signature values, and the minimum hash values across all unique words for each sequence and each unique hashing function are then retained within each sequence's final minhash signature. In applications where the similarity calculation incorporates word length or the frequency of each minimum hash value, the length and frequency for any word resulting in a particular minimum hash value can also be contained as additional properties within each minhash signature's values. However, lengths are not retained within the STRAND data structure during learning since they can quickly be determined during any subsequent classification's minhashing processing.

The STRAND data structure actually represents an array containing one data structure for each unique hashing function used. Since this structure is keyed using minhash values, hash function partitions must exist to separate the minhash values produced by each unique hashing function. Within each individual hash function partition, a collection of key-value pairs exists which contains the minhash value as a key and then a second nested collection of key-value pairs as for each value. The nested collection of kvp values contains all category numbers and associated frequencies (when required) that have been encountered for a particular minhash value. In practice however, minhash values seldom appear to be associated with more than one taxonomy category which drastically reduces the opportunity for imbalance between categories, especially when minhash value frequencies are not used within the classification similarity function.

B. Reducing Sequence Minhash Signatures into Category Signatures

During learning, minimum hash values for each unique hashing function are retained within the array of nested categorical key-value pair collections and partitioned by each unique hashing function. Each hash function's collection contains all unique minimum hash values, their associated taxonomies, and optional frequencies. Using the STRAND data structure, minhash signatures for each input data sequence can quickly be compared to all minimum hash values associated with each known taxonomy including the taxonomy frequency (when utilized) during classification. During training, each value in the input data sequence's minhash signature is reduced into the STRAND data structure by either creating a new entry or adding additional taxonomy categories to an existing entry's nested categorical key-value pair collection.

All results presented in this research were achieved using only a binary classification similarity function. This approach produced optimal performance while still achieving comparable accuracy results when benchmarked against the current top performer in this domain.

IV. CLASSIFICATION PROCESS

For classification we use the same MapReduce style architecture as for learning. The mapping process into sequence minhash signatures is identical, but the reduce function now, instead of creating category signatures, creates classification scores. Many different scores can be efficiently computed using this framework, however, in the following the scoring mechanism currently being used is defined.

Between the input sequence and each taxonomy identified during learning. While the application's parallel framework can easily support more sophisticated classification functions, the similarity measure deployed consistently outperformed all other classification functions tested in a majority of trials against the RDP sequence training set. In addition, the similarity measure yields much higher processing performance and comparable accuracy when benchmarked against RDP's Bayesian classification method.

First, the notation is defined.

Definition 5: Sequence—Let S be a single input sequence. The minhash value set of S is denoted by S where $s_i \in S$ is the sequence's minhash value for the ith hash function with $i = \{1, 2, \ldots I\}$.

Definition 6: Categories—Let C be the set of all known taxonomy categories and $c_i \in C$ be a single category where $i = \{1, 2, \ldots L\}$.

First, each unique hashing function used to create a minhash signature produces only one minimum hash value. Furthermore, all minimum hash values retained during learning are partitioned by each individual hashing function.

Given the input sequence S the following 4 sets can be used during classification to calculate similarity for a single hashing function:

1) $s_i \in S$: The set S contains one minimum hash value $s_i$ generated from an input sequence S of unknown taxonomy.
2) $m_i \in M$: The set M contains all minimum hash values $m_i$ generated by a single hashing function while learning any number of input sequences S which are associated with known taxonomies.
3) $t_k \in T$: The set T contains all taxonomy categories $t_k$ associated with a single minimum hash value from the set M.
4) $c_l \in C$: The set C contains all known taxonomy categories $c_l$ encountered during learning.

Now, consider the logarithmically scaled minhash term frequency mf which is defined as:

$$mf(s_i, M) = 1 + \log(s_i \in M)$$

Since the raw term frequency for $s_i$ is always equal to 1, $mf(s_i, M)$ is also always equal to 1 when the minimum hash value $s_i$ is contained within the set M. Therefore, performing the intersection of $|S \cap M|$ is not only an approximation for its Jaccard similarity [16] but also for its logarithmically scaled term frequency.

Next, consider the logarithmically scaled taxonomy category document frequency given by the function df as:

$$df(t_k \in T, c_l \in C) = \log\left(\frac{c_l \in C}{t_k \in T}\right)$$

Finally, the term frequency–inverse document frequency is given by the function tf–idf:

$$tf\text{-}idf = mf(s_i, M) df(t_k \in T, c_l \in C)$$

However, since it has been shown that the function mf is always equal to 1 using the sets above, the function tf–idf is also equal to the function df.

STRAND uses a family of random hashing functions $h_1, h_2, h_3 \ldots h_n$ to produce a random permutation over the input set S during both learning and classification using the function minhash to create a minimum-hash-signature where:

1) minhash ⇒ applies $h_1, h_2, h_3 \ldots h_n$ on all words contained in S and returns the minimum value for each random hashing function $h_1, h_2, h_3 \ldots h_n$ within the minimum-hash-signature.
2) minhash: $S \Rightarrow \mathbb{Z}_+^k$ Now, consider the Jaccard similarity function J which would calculate the similarity between two sets $S_1$ and $S_2$ using the intersection divided by the union for all words contained in $S_1$ and $S_2$ where:

$$J(S_1, S_2) = \frac{|S_1 \cap S_2|}{|S_1 \cup S_2|}$$

In applications where locality sensitive hashing is deployed to drastically reduce the total resources required for searching and storing all words $s_i \in S$ using the function minhash, we know that:

$$|minhash(S_1) \cap minhash(S_2)| \approx J(S_1, S_2) \qquad [16]$$

Finally, the minhash category collision similarity function MCC used to determine potential classifications between the input sequence and each taxonomy identified during learning can be described as:

$$MCC(S, M) = \sum_{i=1}^{h_n} (|S \cap M|)$$

Or, in the alternative the function MCC can be applied using tf–idf as follows:

$$MCC(S, M) = \sum_{i=1}^{h_n} (df(t_k \in T, c_l \in C))$$

However, empirical results show no difference in accuracy between these two methods using all of the benchmarks described within the results section, but the first method does achieve optimal performance in all cases tested.

V. RESULTS

STRAND was benchmarked against the RDP classifier using ten-fold cross-validation which was performed on the RDP Classifier's 16S trainsetNo9 raw training dataset. While the STRAND system learns at speeds very similar to RDP, it is able to classify with very similar accuracy at speeds 1000% or 10 times faster than RDP. In addition, during the benchmark results performed below, the STRAND system stored only 300 unique integer values for each sequence learned within its minhash signature. However, in practice many sequences share the same taxonomy hierarchy and minimum hash values during learning making the average number of unique integer values retained per sequence much lower.

The RDP Classifier was accessed using the R programming language's BioTools package and the rdp-classifier-2.5.jar. All benchmarks were performed on a Windows 7 64 bit 2.2 Ghz Intel i7-2675QM quad core hyper-threaded laptop with 6 GB of memory installed. During ten-fold cross-validation, the entire training file is randomly shuffled and then divided into 10 equally sized folds or segments. While 9 folds are learned, 1 fold is held out for classification testing. This process is repeated until all 10 folds have been held out and classified against. The STRAND system used a 3% random sample size and word lengths of 75 and 200 bases to achieve the benchmark results below.

A. STRAND Vs. RDP Ten-Fold Cross-Validation Performance Results

TABLE I shows STRAND vs. RDP's system performance results when executing ten-fold cross-validation against the RDP training dataset. While the learning times for each fold are very similar, STRAND classification times are drastically reduced with STRAND performing taxonomy classifications at speeds 1000% or 10 times faster than RDP. While STRAND can train against 8,296 sequences averaging around 0:42 (m:ss), RDP is able to train averaging around 0:40 (m:ss) on the same 8,296 sequences. However, since STRAND uses longer variable length words during training and classification, no bootstrap sampling or consensus is required to determine taxonomy assignments during classification. During ten-fold cross-validation, STRAND was able to classify 921 sequences averaging 7 seconds per fold while RDP's average classification time was 81 seconds per fold. This is substantial since classifications occur much more than training in a typical taxonomy classification system.

TABLE I

Ten-fold Cross-validation Performance Comparison between STRAND and RDP

| | Learning Time | Sequences Learned | Classification Time | Sequences Classified |
|---|---|---|---|---|
| STRAND Performance Results | | | | |
| Fold 1 | 0:45 | 8,296 | 0:08 | 921 |
| Fold 2 | 0:45 | 8,296 | 0:07 | 921 |
| Fold 3 | 0:44 | 8,296 | 0:09 | 921 |
| Fold 4 | 0:41 | 8,296 | 0:09 | 921 |
| Fold 5 | 0:40 | 8,296 | 0:06 | 921 |
| Fold 6 | 0:42 | 8,296 | 0:08 | 921 |
| Fold 7 | 0:42 | 8,296 | 0:08 | 921 |
| Fold 8 | 0:41 | 8,296 | 0:06 | 921 |
| Fold 9 | 0:42 | 8,296 | 0:06 | 921 |
| Fold 10 | 0:42 | 8,296 | 0:07 | 921 |
| Average | 0:42 | | 0:07 | |
| RDP Performance Results | | | | |
| Fold 1 | 0:40 | 8,296 | 1:18 | 921 |
| Fold 2 | 0:40 | 8,296 | 1:22 | 921 |
| Fold 3 | 0:40 | 8,296 | 1:20 | 921 |
| Fold 4 | 0:40 | 8,296 | 1:20 | 921 |
| Fold 5 | 0:39 | 8,296 | 1:20 | 921 |
| Fold 6 | 0:39 | 8,296 | 1:19 | 921 |
| Fold 7 | 0:39 | 8,296 | 1:21 | 921 |
| Fold 8 | 0:39 | 8,296 | 1:21 | 921 |
| Fold 9 | 0:43 | 8,296 | 1:26 | 921 |
| Fold 10 | 0:42 | 8,296 | 1:24 | 921 |
| Average | 0:40 | | 1:21 | |

B. STRAND Vs. RDP Ten-Fold Cross-Validation Accuracy Results

TABLE II illustrates STRAND vs. RDP's classification accuracy results when executing ten-fold cross-validation against the RDP training dataset. The accuracy results displayed below reflect only predictions against known genus level records. Genus level records, which were not encountered during training, were excluded from these results. STRAND achieves similar overall accuracy to RDP at 96.6% during ten-fold crossvalidation and when training only at the genus level. It is very clear from the results presented below that both STRAND and RDP perform classifications at very comparable levels of accuracy against RDP's training dataset.

TABLE II

Ten-fold Cross-validation Accuracy Comparison between STRAND and RDP

| | Kingdom | Phylum | Class | Order | Family | Genus | Overall |
|---|---|---|---|---|---|---|---|
| STRAND Accuracy Results | | | | | | | |
| Fold 1 | 100% | 99.9% | 99.6% | 99.5% | 98.8% | 95.0% | 98.8% |
| Fold 2 | 100% | 100% | 99.9% | 99.8% | 99.3% | 95.2% | 99.0% |
| Fold 3 | 100% | 100% | 99.6% | 98.3% | 98.6% | 94.3% | 98.6% |
| Fold 4 | 100% | 100% | 99.6% | 99.2% | 98.2% | 93.4% | 98.4% |
| Fold 5 | 100% | 100% | 100% | 100% | 99.6% | 93.2% | 98.8% |
| Fold 6 | 99.8% | 99.8% | 99.8% | 99.3% | 97.9% | 92.9% | 98.2% |
| Fold 7 | 99.9% | 99.9% | 99.9% | 99.5% | 98.7% | 93.6% | 98.6% |
| Fold 8 | 100% | 99.9% | 99.9% | 99.5% | 98.1% | 91.8% | 98.2% |
| Fold 9 | 100% | 100% | 99.9% | 99.9% | 99.2% | 92.8% | 98.6% |
| Fold 10 | 100% | 100% | 99.8% | 99.5% | 98.8% | 92.3% | 98.4% |
| Overall | 100% | 99.9% | 99.8% | 99.5% | 98.7% | 93.4% | 98.6% |
| RDP Accuracy Results | | | | | | | |
| Fold 1 | 100% | 100% | 100% | 99.5% | 98.6% | 95.1% | 98.9% |
| Fold 2 | 100% | 100% | 100% | 99.8% | 98.8% | 94.0% | 98.8% |
| Fold 3 | 100% | 99.9% | 99.8% | 98.9% | 97.6% | 93.3% | 98.3% |
| Fold 4 | 100% | 100% | 99.8% | 99.5% | 99.1% | 93.2% | 98.6% |
| Fold 5 | 100% | 100% | 100% | 99.9% | 99.5% | 94.3% | 98.9% |
| Fold 6 | 100% | 100% | 99.9% | 99.5% | 98.2% | 92.3% | 98.3% |
| Fold 7 | 100% | 100% | 100% | 99.5% | 99.2% | 93.9% | 98.8% |
| Fold 8 | 100% | 100% | 100% | 99.5% | 98.2% | 91.5% | 98.2% |
| Fold 9 | 100% | 99.6% | 99.6% | 99.6% | 99.0% | 93.9% | 98.6% |
| Fold 10 | 100% | 100% | 99.8% | 99.5% | 98.6% | 92.3% | 98.4% |
| Overall | 100% | 100% | 99.9% | 99.5% | 98.7% | 93.4% | 98.6% |

C. STRAND Vs. RDP Space Consumption

Figure 11:
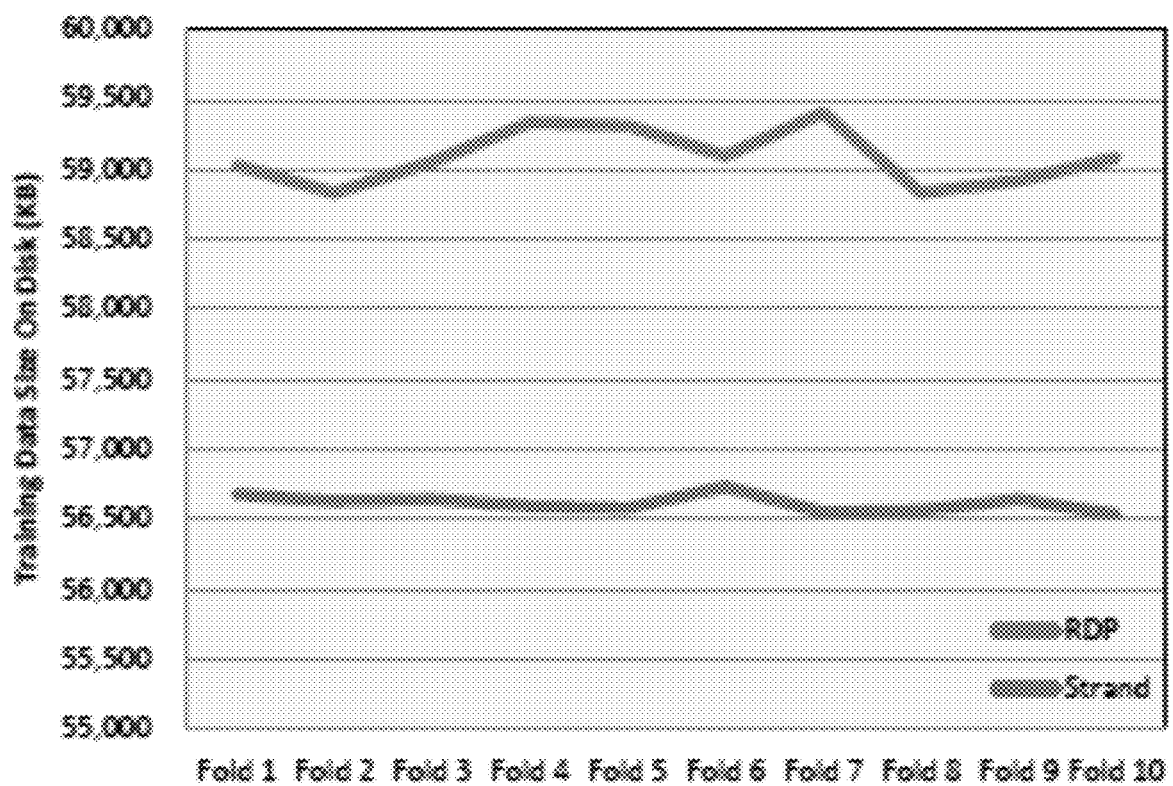
FIG. 11 is a graph showing STRAND vs. RDP Model Disk Space Consumption in accordance with another embodiment of the present invention.

STRAND uses Google's protocol buffers to serialize its training model data to disk. The protocol buffers solution offers highly space efficient storage formats, and the STRAND system only retains on disk what is absolutely necessary to perform subsequent classifications. FIG. 11 shows disk space consumption for STRAND vs. RDP when training against each fold within the RDP training dataset. On average, STRAND disk space consumption was 2,477 KB less for each training fold when compared to RDP.

VI. CONCLUSION

STRAND shows dramatic improvements over current state of the art systems in gene sequence taxonomy classification predicting taxonomy hierarchies at speeds ten times faster than the RDP classifier while maintaining comparable accuracy. Using randomly sampled variable length gene sequence words, STRAND increases the feature space available for making accurate classifications without requiring multiple bootstrap trails to determine a final taxonomy prediction.

A highly parallel MapReduce style pipeline is used to simultaneously map gene sequence input data into variable length word hashes and reduce all word hashes within a single sequence into a minimum hash signature. A form of locality sensitive hashing called minhashing applies a family of random hashing functions to each gene sequence word retaining the minimum value produced by each hashing function to form an input sequence's minimum hash signature. The minhash signature represents a random permutation of all gene sequence words which has been proven to produce an accurate approximation of Jaccard similarity when two minhash signatures are intersected.

During training minhash signatures are further reduced into the STRAND data structure where gene sequence taxonomies are treated as categories and associated with individual minhash values contained within each minhash signature. When gene sequences are submitted for taxonomy classification, the minhash signature is created and then intersected with each known taxonomy category within the STRAND data structure to determine similarity between the input gene sequence's minhash signature and all categories known to the system.

The foregoing shows not only that the intersection of two binary minhash signatures is highly accurate and efficient, but that this approach is equivalent to other more computationally complex similarity calculations, such as logarithmically scaled term frequency, inverse document frequency, and term-frequency inverse-document-frequency within the context of the system described.

It may be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications, patents and patent applications mentioned in the specification are indicative of the level of skill of those skilled in the art to which this invention pertains. All publications, patents and patent applications are herein incorporated by reference to the same extent as if each individual publication, patent or patent application was specifically and individually indicated to be incorporated by reference.

Terms such as "a", "an," and "the" are not intended to refer to only a singular entity, but include the general class of which a specific example may be used for illustration. In addition, the use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it may be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

[1] S. F. Altschul, W. Gish, W. Miller, E. W. Myers, and D. J. Lipman. Basic local alignment search tool. *Journal of Molecular Biology*, 215(3):403-410, 1990.

[2] A. Z. Broder. On the resemblance and containment of documents. In *Compression and Complexity of Sequences 1997. Proceedings*, pages 21-29. IEEE, 1997.

[3] A. Z. Broder, M. Charikar, A. M. Frieze, and M. Mitzenmacher. Minwise independent permutations. In *Proceedings of the thirtieth annual ACM symposium on Theory of computing*, pages 327-336. ACM, 1998.

[4] A. Z. Broder, S. C. Glassman, M. S. Manasse, and G. Zweig. Syntactic clustering of the web. *Computer Networks and ISDN Systems*, 29(8):1157-1166, 1997.

[5] J. Buhler. Efficient large-scale sequence comparison by locality-sensitive hashing. *Bioinformatics* (Oxford, England), 17(5)(420):419Ü428, 2001.

[6] C.-Y. Chiu, H.-M. Wang, and C.-S. Chen. Fast minhashing indexing and robust spatio-temporal matching for detecting video copies. *ACM Transactions on Multimedia Computing, Communications, and Applications (TOMCCAP)*, 6(2):10, 2010.

[7] C. Chu, S. K. Kim, Y.-A. Lin, Y. Yu, G. Bradski, A. Y. Ng, and K. Olukotun. Map-Reduce for machine learning on multicore. *Advances in neural information processing systems*, 19:281, 2007.

[8] 0. Chum, M. Perdoch, and J. Matas. Geometric minhashing: Finding a (thick) needle in a haystack. In *Computer Vision and Pattern Recognition, 2009. CVPR 2009. IEEE Conference on*, pages 17-24. IEEE, 2009.

[9] J. Dean and S. Ghemawat. Mapreduce: A flexible data processing tool. *Communications of the ACM*, 53(1):72-77, 2010.

[10] J. Drew. Mapreduce, map reduction strategies using c #, 2013.

[11] R. C. Edgar. Search and clustering orders of magnitude faster than BLAST. *Bioinformatics* (Oxford, England), 26(19)(1):2460-1, 2010.

[12] D. Keco and A. Subasi. Parallelization of genetic algorithms using Hadoop Map/Reduce. *SouthEast Europe Journal of Soft Computing*, 1(2), 2012.

[13] L. Li, D. Wang, T. Li, D. Knox, and B. Padmanabhan. Scene: A scalable two-stage personalized news recommendation system. In *ACM Conference on Information Retrieval (SIGIR)*, 2011.

[14] G. Marçais and C. Kingsford. A fast, lock-free approach for efficient parallel counting of occurrences of k-mers. *Bioinformatics*, 27(6):764-770, 2011.

[15] A. McKenna, M. Hanna, E. Banks, A. Sivachenko, K. Cibulskis, A. Kernytsky, K. Garimella, D. Altshuler, S. Gabriel, M. Daly, et al. The genome analysis toolkit: A MapReduce framework for analyzing next-generation DNA sequencing data. *Genome research*, 20(9):1297-1303, 2010.

[16] A. Rajaraman and J. Ullman. Mining of Massive Datasets. *Mining of Massive Datasets*. Cambridge University Press, 2012.

[17] C. E. Shannon. A mathematical theory of communication. *The Bell Systems Technical Journal*, 27:379-423, 1948.

[18] E. Ukkonen. Approximate string-matching with q-grams and maximal matches. *Theoretical Computer Science*, 92(205):191-211, 1992.

[19] S. Vinga and J. Almeida. Alignment-free sequence comparison—a review. *Bioinformatics*, 19(4):513-523, 2003.

[20] Q. Wang, G. M. Garrity, J. M. Tiedje, and J. R. Cole. Naive Bayesian classifier for rapid assignment of RNA sequences into the new bacterial taxonomy. *Applied and Environmental Microbiology*, 73(16):5261-5267, 2007.

What is claimed is:

1. A computerized method for classifying data comprising:
    (a) receiving the data;
    (b) performing a chunking operation comprising dividing the received data into two or more chunks, and making each chunk available for further processing by a mapping operation after being created;
    (c) prior to completion of the chunking operation on all of the received data, performing the mapping operation comprising mapping each available chunk into a token, storing the token in a token collection, and making each token available for further processing by a hashing operation after being mapped;
    (d) prior to completion of the mapping operation on all of the chunks, performing the hashing operation comprising hashing each available token using two or more local sensitivity hashing functions, wherein each local sensitivity hashing function contains two or more random hashing seed numbers, determining a minimum hash value for each local sensitivity hashing function, storing the minimum hash value for each local sensitivity hashing function in a minimum hash set collection, and making each hashed token available for further processing by a classification operation after being hashed;
    (e) prior to completion of the hashing operation on all of the tokens, performing a classification operation comprising classifying the data using the minimum hash values for each available hashed token;
    managing any potential differences in production and consumption speeds between the chunking operations and the mapping operations using a blocking mechanism;
    wherein the foregoing steps are performed by one or more processors.

2. The method of claim 1, wherein:
    step (c) is performed on multiple chunks simultaneously using two or more processors operating in parallel;
    step (d) is performed on multiple tokens simultaneously using two or more processors operating in parallel; or step (e) is performed on multiple chunks simultaneously using two or more processors operating in parallel.

3. The method of claim 1, wherein the two or more chunks overlap one another by a stagger offset.

4. The method of claim 1, wherein steps (a) through (e) are used to construct a learning machine.

5. The method of claim 1, wherein the step of receiving the data comprises the step of extracting the data from one or more data sources.

6. The method of claim 1, wherein the data further comprises one or more categories associated with the data.

7. The method of claim 1, wherein the data comprises an unstructured gene sequence data.

8. The method of claim 7, wherein the unstructured gene data further comprises one or more categories, a gene sequence full name, a fasta identification number, a kingdom, a phylum, a class, an order, a family genus, a species or a combination thereof.

9. The method of claim 1, further comprising the step of validating the data.

10. The method of claim 1, further comprising the steps of:
receiving an input data comprising two or more sets of data;
separating the two or more sets of data from one another; and
determining whether to classify the two or more sets of data sequentially, parallel or a combination thereof.

11. The method of claim 1, further comprising the step of assigning a unique identifier to the data.

12. The method of claim 1, further comprising the step of maintaining a collection of the data, a collection of one or more categories associated with the data, a collection of totals of the categories, and a collection of category default frequencies.

13. The method of claim 1, wherein the chunking operations, mapping operations, hashing operations and classification operations are performed concurrently.

14. The method of claim 1, wherein the chunks, token collection, and the minimum hash set collections are stored in a memory.

15. A system for classifying data comprising:
at least one input/output interface;
a data storage;
one or more processors communicably coupled to the at least one input/output interface and the data storage; and
the one or more processors perform the steps of (a) receiving the data from the at least one input/output interface, (b) performing a chunking operation comprising dividing the received data into two or more chunks, and making each chunk available for further processing by a mapping operation after being created, (c) prior to completion of the chunking operation on all of the received data, performing the mapping operation comprising mapping each available chunk into a token, storing the token in a token collection, and making each token available for further processing by a hashing operation after being mapped, (d) prior to completion of the mapping operation on all of the chunks, performing the hashing operation comprising hashing each available token using two or more local sensitivity hashing functions, wherein each local sensitivity hashing function contains two or more random hashing seed numbers, determining a minimum hash value for each local sensitivity hashing function, storing the minimum hash value for each local sensitivity hashing function in a minimum hash set collection, and making each hashed token available for further processing by a classification operation after being hashed, (e) prior to completion of the hashing operation on all of the tokens, performing a classification operation comprising classifying the data using the minimum hash values for each available hashed token, and managing any potential differences in production and consumption speeds between the chunking operations and the mapping operations using a blocking mechanism.

16. The system of claim 15, wherein the one or more processors perform:
step (c) on multiple chunks simultaneously using two or more processors operating in parallel;
step (d) on multiple tokens simultaneously using two or more processors operating in parallel; or
step (e) on multiple chunks simultaneously using two or more processors operating in parallel.

17. The system of claim 15, wherein the two or more chunks overlap one another by a stagger offset.

18. The system of claim 15, wherein the one or more processors use steps (a) through (e) to construct a learning machine.

19. The system of claim 15, wherein the one or more processors perform the step of receiving the data by extracting the data from one or more data sources.

20. The system of claim 15, wherein the data further comprises one or more categories associated with the data.

21. The system of claim 15, wherein the data comprises an unstructured gene sequence data.

22. The system of claim 21, wherein the unstructured gene data further comprises one or more categories, a gene sequence full name, a fasta identification number, a kingdom, a phylum, a class, an order, a family genus, a species or a combination thereof.

23. The system of claim 15, wherein the one or more processors further perform the step of validating the data.

24. The system of claim 15, wherein the one or more processors further perform the steps of:
receiving an input data comprising two or more sets of data;
separating the two or more sets of data from one another; and
determining whether to classify the two or more sets of data sequentially, parallel or a combination thereof.

25. The system of claim 15, wherein the one or more processors further perform the step of assigning a unique identifier to the data.

26. The system of claim 15, wherein the one or more processors further perform the step of maintaining a collection of the data, a collection of one or more categories associated with the data, a collection of totals of the categories, and a collection of category default frequencies.

27. The system of claim 15, wherein the chunking operations, mapping operations, hashing operations and classification operations are performed concurrently.

28. The system of claim 15, wherein:
the data storage comprises a memory; and
the chunks, token collection, and the minimum hash set collections are stored in the memory.

29. A computer program embodied on a non-transitory computer readable storage medium that is executed using one or more processors for classifying data comprising:
(a) a code segment for receiving the data;
(b) a code segment for performing a chunking operation comprising dividing the received data into two or more chunks, and making each chunk available for further processing by a mapping operation after being created;

(c) a code segment for prior to completion of the chunking operation on all of the received data, performing the mapping operation comprising mapping each available chunk into a token, storing the token in a token collection, and making each token available for further processing by a hashing operation after being mapped;

(d) a code segment for prior to completion of the mapping operation on all of the chunks, performing the hashing operation comprising hashing each available token using two or more local sensitivity hashing functions, wherein each local sensitivity hashing function contains two or more random hashing seed numbers, determining a minimum hash value for each local sensitivity hashing function, storing the minimum hash value for each local sensitivity hashing function in a minimum hash set collection, and making each hashed token available for further processing by a classification operation after being hashed;

(e) a code segment for prior to completion of the hashing operation on all of the tokens, performing a classification operation comprising classifying the data using the minimum hash values for each available hashed token; and a code segment for managing any potential differences in production and consumption speeds between the chunking operations and the mapping operations using a blocking mechanism.

30. A system for large-scale and rapid parallel processing, learning, and classification of extremely large volumes of gene sequence data comprising:

at least one input/output interface;

a data storage;

a plurality of interconnected processors communicably coupled to the at least one input/output interface and the data storage, wherein the plurality of interconnected processors perform a plurality of processes;

the plurality of processes including a master process for coordinating the processing of a set of at least one gene sequence input data, a set of at least one application-independent Map Reduction Aggregation Methods, a set of at least one application-independent Classification Metric Functions, a set of at least one application-independent category managers, a set of at least one application-independent nested categorical key value pair collections, a set of at least one application-independent reduction operations, a set of at least one application-independent Blocking Mechanisms, a set of at least one transitional outputs collection and worker processes;

the master process performing the learning and/or classification processing coordination in response to a request to perform the learning and/or classification processing job, allocating portions of the gene sequences input data containing gene sequence text to at least one of the Map Reduction Aggregation Methods and allocating portions of the gene sequence input data containing gene sequence text and category associations to at least one of the category managers;

each of the Map Reduction Aggregation Methods including at least one Chunking Operations module comprising a first plurality of worker processes for receiving and mapping portions of the gene sequences input data into individual, independent units of transitional Sequence Chunk work comprising a consistently mapped data key and optional values that are conducive to simultaneous parallel Mapping Operations processing, wherein at least two of the first plurality of the worker processes perform Chunking Operations simultaneously in parallel;

each of the Map Reduction Aggregation Methods including at least one Mapping Operations modules comprising a second plurality of worker processes for receiving and mapping transitional Sequence Chunk outputs into individual, independent units of transitional Sequence Token work comprising a consistently mapped data key and optional values that are conducive to simultaneous parallel Locality Sensitive Hashing Operations processing, wherein at least two of the second plurality of the worker processes perform Mapping Operations simultaneously in parallel;

each of the Map Reduction Aggregation Methods including at least one Locality Sensitive Hashing modules comprising a third plurality of worker processes for receiving and performing Locality Sensitive Hashing operations on transitional Sequence Token outputs producing individual, independent units of transitional MinHash Set Items work comprising a collection of minimum hash value keys produced from a plurality of unique hashing functions and optional values that are conducive to simultaneous Reduction Operations processing and/or Classification Metric Functions, wherein at least two of the third plurality of the worker processes perform Locality Sensitive Hashing Operations simultaneously in parallel;

each of the Map Reduction Aggregation Methods including at least one transitional outputs collection allowing for shared thread-safe accesses by at least one worker process acting as a transitional outputs producer and at least one worker process acting as a transitional outputs consumer, wherein a Blocking Mechanism is utilized for managing accesses to the transitional outputs collection, wherein at least two of the worker processes perform production and consumption operations simultaneously in parallel;

each of the Map Reduction Aggregation Methods including at least one Blocking Mechanism that in response to notification when transitional outputs production has started manages the potential differences in the production and consumption speeds between at least one worker process acting as a transitional outputs producer and at least one worker process acting as a transitional outputs consumer, wherein each Blocking Mechanism in response to a complete depletion of transitional outputs by consumption worker processes before the production worker processes have completed production allows consumption worker processes to "block" or wait until additional transitional outputs are produced, wherein each Blocking Mechanism in response to an over-production of transitional outputs by the production worker processes exceeding a pre-defined transitional outputs capacity threshold allows consumption worker processes to "block" or wait until additional transitional outputs are consumed and the transitional outputs capacity threshold is no longer exceeded, wherein at least two of the worker processes perform Blocking Mechanism production and consumption operations simultaneously in parallel;

each reduction operations including at least one application specific Reduction Operations modules comprising a fourth plurality of worker processes for receiving and aggregating transitional MinHash Set Items output by reducing the minimum hash value keys and optional values eliminating the matching keys and aggregating the optional values into at least one nested categorical key value pair collection, wherein at least two of the fourth plurality of the worker processes perform Reduction Operations simultaneously in parallel;

each Classification Metric Function including one or more Classification Metric Function Operations modules comprising a fifth plurality of worker processes for performing frequency, similarity, or distance calculations, wherein each calculation is performed using the items within at least one Map Reduction Aggregation transitional output collection and/or using Map Reduction Aggregation outputs and associated categories consolidated into the Nested Categorical Key Value Pair Collection, wherein at least two of the fifth plurality of worker processes simultaneously perform the Classification Metric Functions Operations in parallel;

each Category Manager including one or more category and gene sequence management functions comprising at least one set of unique categories and Category IDs, gene sequences and Sequence IDs, default frequencies including all Sequence ID and Category ID associations, and category totals including relevant totals for all categories;

the Map Reduction Aggregation Methods applying Chunking Operations, Mapping Operations, and Locality Sensitive Hashing Operations to the retrieved input data to produce transitional MinHash Set Item outputs corresponding to a reduced set of minimum hash values representing the unique characteristics of each individual gene sequence text provided within the gene sequence input data; and the Classification Metric Functions applying Classification Metric Functions Operations to the transitional MinHash Set Item outputs to produce Classification Totals and/or Penetration Totals corresponding to the similarity, distance, or classification between each individual gene sequence text provided within the gene sequence input data for classification and at least one other MinHash Set Item output and/or using Map Reduction Aggregation outputs and associated categories consolidated into the Nested Categorical Key Value Pair Collection.

31. The system of claim 30, wherein:

the final outputs of one or more similar Map Reduction Aggregation Methods are placed into a consolidated collection of nested key value pairs where the key for each key-value pair includes a minimum hash value or gene token text key which maps to a second or nested set of "categorical" keys or key-value pairs as its value;

the master process performing the Reduction Operations coordination in response to a request to perform consolidation of Map Reduction Aggregation transitional outputs, wherein the Reduction Operations perform the consolidation;

the second or nested set of "categorical" keys or key-value pairs including categorical associations of the minimum hash value or gene token key across any number of categorical keys contained in the nested set, wherein a key-value pair's optional values may include any numerical frequency information or other data relevant for performing classification metric function operations;

the keys within each consolidated collection of nested key value pairs being partitioned or otherwise divided by each unique hashing function when Locality Sensitive Hashing Operations are deployed; and the keys within each consolidated collection of nested key value pairs also being further partitioned or otherwise divided by each Map Reduction Aggregation Method when at least two non-similar Map Reduction Aggregation Methods are deployed within the same system.

32. The system of claim 30, wherein:

each Category Manager in response to receiving a set of at least one gene sequence's text and a set of at least one category associated with each gene sequence's text, assigning any new categories a unique Category ID and assigning any new gene sequences a unique Sequence ID;

each Category Manager in response to receiving a set of at least one Sequence IDs associated with a set of at least one Category IDs creating a set of default frequencies comprising a Sequence ID key and at least one Category ID key or key value pair including an optional value that contains a default frequency value and/or other relevant values, wherein each unique set of default frequencies contains at least one entry for each unique Category ID associated with a unique Sequence ID;

each Category Manager in response to requests for categories or default frequency values associated with a Sequence ID providing the Sequence ID's default frequency set to the requestor;

each Category Manager maintaining a list of Category Totals representing a list of frequency and/or other relevant totals for each unique Category ID within the consolidated collection of nested key value pairs or a known Min Hash Set item; and each Category Manager in response to requests for category totals associated with a Category ID providing the appropriate Category ID total to the requestor.

33. The system of claim 30, wherein:

at least one Reduction Operations consolidate MinHash Set Item's minimum hash values or Sequence Token's gene token text keys into a Nested Categorical Key Value Pair Collection eliminating matching minimum hash values or gene token text keys and aggregating the MinHash Set Item or Sequence Token values consistent with the specified Reduction Operations;

the master process performing the Reduction Operations coordination in response to a request to perform a learning and/or classification processing job;

each Reduction Operations in response to identifying a new or unique keys making a copy of the default frequencies set associated with the MinHash Set Item or Sequence Token's Sequence ID and using the default frequencies as the second or nested collection of "categorical" key-value pairs in the new Nested Categorical Key Value Pair Collection entry; and each Reduction Operations in response to modifying the Nested Categorical Key Value Pair Collection maintaining and updating the Category Manager's Category Totals for each category total impacted.

34. The system of claim 30, wherein:

the Classification Metric Functions maintain a collection of Classification Totals and/or a collection of Category Penetration Totals to perform similarity or distance calculations between at least one Map Reduction Aggregation transitional output collection and/or using Map Reduction Aggregation outputs and associated categories consolidated into a Nested Categorical Key Value Pair Collection;

the master process performing the Classification Metric Function coordination in response to a request to perform classification of the input data;

the Classification Metric Functions maintaining and updating the Classification Totals consistent with a specified Length Weighted Frequency Jaccard embodiment or another custom distance or similarity function aggregating totals for all required categories associated with each matching key identified; and the Classification Metric Functions maintaining and updating the Category Penetration Totals in response to notification that Classification Totals have completed and calculating a specified Length Weighted Frequency Jaccard embodiment or another custom distance or similarity function's final values for each category contained within the Classification Totals.

35. The system of claim 30, wherein the Locality Sensitive Hashing Operations comprises:

the plurality of processes further include a second master process for coordinating the processing of at least one set of gene sequence's Sequence Tokens input data, a set of at least one MinHash Initialization modules, a set of at least one MinHash Producer modules, a set of at least one MinHash Set Item outputs, and worker processes;

the second master process performing the Locality Sensitive Hashing processing coordination in response to a request to perform the Locality Sensitive Hashing operations, allocating each of the Sequence Token inputs containing small variable length samples of gene sequence text to at least one of the MinHash producer's worker processes;

each of the Locality Sensitive Hashing operations including at least one MinHash Initialization module using a predefined Universe Size value to generate non-negative random numbers up to the specified Universe Size used during the creation of a specified number of unique hashing functions each containing a plurality of random numbers used as hashing seeds, wherein each unique hashing function is stored in at least one MinHash delegates collection;

each of the Locality Sensitive Hashing operations including at least one MinHash Producer module comprising a first plurality of worker processes for receiving and hashing each Sequence Token's text or a pre-defined hash value for each Sequence Token's text one time for each unique hashing function contained within the MinHash Delegates collection, wherein at least two of the first plurality of the worker processes perform Locality Sensitive Hashing operations simultaneously in parallel;

each of the Locality Sensitive Hashing operations including at least one SkipDups collection for ensuring that duplicate text values contained within a Gene Token's text are hashed only one time for each unique gene sequence by each of the unique hashing functions contained within the MinHash Delegates collection;

each of the SkipDups collections using SkipDup composite keys comprising a Sequence Token's Sequence ID and text or a pre-defined hash value for a Sequence Token's text to identify duplicate Sequence Tokens within the same gene sequence;

each of the Locality Sensitive Hashing operations including a collection of MinHash Set Items for retaining the minimum hash values produced by each of the unique hashing functions contained within the MinHash delegates collection for each unique gene sequence's Gene Tokens that Locality Sensitive Hashing operations are performed against;

each MinHash Set Item containing one entry for each unique hashing function contained within the MinHash delegates collection or in alternative embodiments only a smaller predefined number of hashing operations can be performed to identify candidate matches before full MinHash Sets are produced; and each MinHash Producer in response to receiving a Sequence Token input creating a SkipDup key, determining if MinHashing has been performed, hashing each Sequence Token's text or a pre-defined hash value for a Sequence Token's text one time for each hashing function contained within the MinHash delegates collection or a candidate set of hashing functions in alternative embodiments, and retaining the minimum hash values produced for each unique hashing function within each unique gene sequence in the collection of MinHash Set Item outputs.

36. A system for large-scale and rapid parallel Locality Sensitive Hashing of gene sequence Sequence Tokens input data comprising:

at least one input/output interface;

a data storage;

a plurality of interconnected processors communicably coupled to the at least one input/output interface and the data storage, wherein the plurality of interconnected processors perform a plurality of processes;

the plurality of processes including a master process for coordinating the processing of at least one set of gene sequence's Sequence Tokens input data, a set of at least one MinHash Initialization modules, a set of at least one MinHash Producer modules, a set of at least one MinHash Set Item outputs, and worker processes;

the master process performing the Locality Sensitive Hashing processing coordination in response to a request to perform the Locality Sensitive Hashing operations, allocating each of the Sequence Token inputs containing small variable length samples of gene sequence text to at least one of the MinHash producer's worker processes;

each of the Locality Sensitive Hashing operations including at least one MinHash Initialization module using a predefined Universe Size value to generate non-negative random numbers up to the specified Universe Size used during the creation of a specified number of unique hashing functions each containing a plurality of random numbers used as hashing seeds, wherein each unique hashing function is stored in at least one MinHash delegates collection;

each of the Locality Sensitive Hashing operations including at least one MinHash Producer module comprising a first plurality of worker processes for receiving and hashing each Sequence Token's text or a pre-defined hash value for each Sequence Token's text one time for each unique hashing function contained within the MinHash Delegates collection, wherein at least two of the first plurality of the worker processes perform Locality Sensitive Hashing operations simultaneously in parallel;

each of the Locality Sensitive Hashing operations including at least one SkipDups collection for ensuring that duplicate text values contained within a Gene Token's text are hashed only one time for each unique gene sequence by each of the unique hashing functions contained within the MinHash Delegates collection;

each of the SkipDups collections using SkipDup composite keys comprising a Sequence Token's Sequence ID and text or a pre-defined hash value for a Sequence Token's text to identify duplicate Sequence Tokens within the same gene sequence;

each of the Locality Sensitive Hashing operations including a collection of MinHash Set Items for retaining the minimum hash values produced by each of the unique hashing functions contained within the MinHash delegates collection for each unique gene sequence's Gene Tokens that Locality Sensitive Hashing operations are performed against;

each MinHash Set Item containing one entry for each unique hashing function contained within the MinHash delegates collection or in alternative embodiments only a smaller predefined number of hashing operations can be performed to identify candidate matches before full MinHash Sets are produced; and each MinHash Producer in response to receiving a Sequence Token input creating a SkipDup key, determining if MinHashing has been performed, hashing each Sequence Token's text or a pre-defined hash value for a Sequence Token's text one time for each hashing function contained within the MinHash delegates collection or a candidate set of hashing functions in alternative embodiments, and retaining the minimum hash values produced for each unique hashing function within each unique gene sequence in the collection of MinHash Set Item outputs.

37. A computerized method for mapping gene sequences into Gene Sequence Chunks containing portions of the gene sequence's text broken into individual, independent units of transitional work conducive to simultaneous parallel downstream processing comprising:

providing at least one input/output interface, a data storage and one or more processors communicably coupled to the at least one input/output interface and the data storage, wherein the processors perform the following steps;

receiving gene sequences input data containing at least one gene sequence text and possibly one or more categories associated with the gene sequence text;

creating one unique Sequence ID per gene sequence means identifying each gene sequence's text with a unique number operable for referring to the gene sequence in one or more associations throughout the system while maintaining only one copy of the gene sequence's text and possibly many copies of the Sequence ID utilized in many associations;

creating one unique Category ID per unique category associated with any of the gene sequence's text means identifying each category with a unique number operable for referring to the category in one or more associations throughout the system while maintaining only one copy of the category's text and possibly many copies of the Category ID utilized in many associations; and creating a set of default frequencies means a set of key value pairs comprising one entry for each unique Category ID associated with a unique Sequence ID, wherein a Sequence ID key and at least one value containing a Category ID or nested key value pair including an optional value that contains a default frequency value and/or other relevant values for perform Classification Metric Functions.

38. The method of claim 37, further comprising:
performing Simple Chunking, if Stagger Chunking has not been deployed;
each Simple Chunking operation in response to receiving a gene sequence's text, setting a Start Position equal to the current Start Position+1, wherein the StartPosition's default value is equal to 0;
setting an End Position equal to the Start Position+a pre-defined Maximum Token Length, or the last position in the gene sequence's text, whichever is closer;
creating a Sequence Chunk equal to the text between the current Start and End Positions; and
continuing the specified Simple Chunking operations until the Start Position is less than the gene sequence's text length–minimum token length.

39. The method of claim 37, further comprising:
performing Stagger Chunking First Offset Operations, if Stagger Chunking is deployed;
each Stagger Chunking operation in response to receiving a gene sequence's text performs First Offset Operations, setting a Start Position equal to the current End Position+1, wherein the Start Position's default starting value is equal to 0;
setting an End Position equal to the Start Position+the First Offset value, or the last position in the gene sequence's text, whichever is closer;
creating a Sequence Chunk equal to the text between the current Start and End Positions; and
repeating First Offset Operations while the current Start Position is less than the gene sequence text length.

40. The method of claim 37, further comprising:
performing Stagger Chunking Stagger Offset Operations, if Stagger Chunking is deployed;
each Stagger Chunking operation in response to receiving a gene sequence's text performs Stagger Offset Operations, setting a Start Position equal to the current End Position+1, wherein the Start Position's default starting value is equal to the First Offset/2 truncated or rounded to a whole number;
setting an End Position equal to the Start Position+the First Offset value, or the last position in the gene sequence's text, whichever is closer;
creating a Sequence Chunk equal to the text between the current Start and End Positions; and
repeating Stagger Offset Operations while the current Start Position is less than the gene sequence text length.

41. A computerized method for mapping gene sequences into Gene Sequence Tokens containing small samples of a gene sequence's text broken into individual, independent units of transitional work conducive to simultaneous parallel downstream processing comprising:

providing at least one input/output interface, a data storage and one or more processors communicably coupled to the at least one input/output interface and the data storage, wherein the processors perform the following steps;

receiving gene sequence input data containing at least one gene sequence text or the starting and ending positions of a gene sequence's text, and a gene's Sequence ID;

setting the Start Position and Ending Position equal to the first position within the gene sequence's text, or setting the Ending Position equal to the Minimum Token Length, if a Minimum Token Length is used;

creating a Sequence Token equal to the text between the current Start and End Positions;

setting the End Position equal to the End Position+1; and
repeating the specified operations until the Maximum Token Length or the end of gene sequence's text is reached, whichever occurs first.

42. The method of claim 41, further comprising:
performing Stagger Mapping Operations, if Stagger Chunking is deployed;
setting the Start Position to the last Start Position+1 and the Ending Position equal to the last Start Position+1 or the Minimum Token Length, whichever is greater;
creating a Sequence Token equal to the text between the current Start and End Positions;
setting the End Position equal to the End Position+1; and
repeating the specified operations end of gene sequence's text–the minimum token length is reached, whichever occurs first.

43. A computerized method for the locality sensitive hashing of gene sequences comprising:
providing at least one input/output interface, a data storage and one or more processors communicably coupled to the at least one input/output interface and the data storage, wherein the processors perform the following steps;
receiving gene sequences input data containing at least one gene sequence text;
mapping gene sequences into transitional Gene Sequence Chunks by (a) receiving gene sequences input data containing at least one gene sequence text and possibly one or more categories associated with the gene sequence text, (b) creating one unique Sequence ID per gene sequence means identifying each gene sequence's text with a unique number operable for referring to the gene sequence in one or more associations throughout the system while maintaining only one copy of the gene sequence's text and possibly many copies of the Sequence ID utilized in many associations, (c) creating one unique Category ID per unique category associated with any of the gene sequence's text means identifying each category with a unique number operable for referring to the category in one or more associations throughout the system while maintaining only one copy of the category's text and possibly many copies of the Category ID utilized in many associations, and (d) creating a set of default frequencies means a set of key value pairs comprising one entry for each unique Category ID associated with a unique Sequence ID, wherein a Sequence ID key and at least one value containing a Category ID or nested key value pair includes an optional value that contains a default frequency value and/or other relevant values for performing Classification Metric Functions;
mapping Gene Sequence Chunks into transitional Gene Sequence Tokens by (a) receiving gene sequence input data containing at least one gene sequence text or the starting and ending positions of a gene sequence's text, and a gene's Sequence ID, (b) setting the Start Position and Ending Position equal to the first position within the gene sequence's text, or setting the Ending Position equal to the Minimum Token Length, if a Minimum Token Length is used, (c) creating a Sequence Token equal to the text between the current Start and End Positions, (d) setting the End Position equal to the End Position+1, and (e) repeating the specified operations until the Maximum Token Length or the end of gene sequence's text is reached, whichever occurs first;
receiving each transitional Gene Sequence Token;
creating a set of unique hashing functions used for the locality sensitive hashing operations;
creating a SkipDup key comprising the Gene Sequence Token's Sequence ID and text or pre-determined text hash value;
maintaining a SkipDup key set ensuring that only unique Gene Sequence Token's text or pre-determined text hash values are hashed one time for each unique gene Sequence ID and one time for each of the unique hashing functions used in the locality sensitive hashing operations;
maintaining a MinHash Set Item for each unique Sequence ID for which locality sensitive hashing operations are performed;
each time a unique Gene Sequence Token and SkipDup key are encountered, determining if a MinHash Set Item exists for the Gene Sequence Token's Sequence ID and creating a new MinHash Set Item for Sequence IDs when needed;
each time a unique hashing function produces a minimum hash value, retaining the value within the MinHash Set Item for each unique hashing function; and
providing a MinHash Set Item as locality sensitive hashing operations output for each unique Gene Sequence ID for which locality sensitive hashing operations are performed.

* * * * *